United States Patent
Francis, IV et al.

(10) Patent No.: US 10,119,327 B2
(45) Date of Patent: Nov. 6, 2018

(54) METHOD AND APPARATUS FOR AN INSULATING GLAZING UNIT AND COMPLIANT SEAL FOR AN INSULATING GLAZING UNIT

(71) Applicant: ASTRAVAC GLASS, INC., Colorado Springs, CO (US)

(72) Inventors: William H. Francis, IV, Boulder, CO (US); Gregg E. Freebury, Louisville, CO (US); Neal J. Beidleman, Aspen, CO (US); Michael Hulse, Eerie, CO (US)

(73) Assignee: ASTRAVAC GLASS, INC., Colorado Springs, CO (US)

( * ) Notice: Subject to any disclaimer, the term of this patent is extended or adjusted under 35 U.S.C. 154(b) by 85 days.

(21) Appl. No.: 15/141,485

(22) Filed: Apr. 28, 2016

(65) Prior Publication Data
US 2017/0002602 A1    Jan. 5, 2017

Related U.S. Application Data

(63) Continuation of application No. 13/464,951, filed on May 4, 2012, now Pat. No. 9,328,512.
(Continued)

(51) Int. Cl.
*E06B 3/677* (2006.01)
*E06B 3/673* (2006.01)
(Continued)

(52) U.S. Cl.
CPC ............... *E06B 3/673* (2013.01); *B23K 1/06* (2013.01); *B32B 37/06* (2013.01);
(Continued)

(58) Field of Classification Search
CPC .... E06B 3/673; E06B 3/6612; E06B 3/66328; E06B 3/66357; E06B 3/6775;
(Continued)

(56) References Cited

U.S. PATENT DOCUMENTS 2,057,452 A    10/1936   Howard
2,122,453 A    7/1938    Clause
(Continued)

FOREIGN PATENT DOCUMENTS

DE    102012104360 A1    11/2013
EP    0240584 A          10/1987
(Continued)

OTHER PUBLICATIONS

"Diffusion Bonding—Ceramics and ceramic/meal joints", TWI Knowledge Summary, 2000. http://www.twi.co.uk/content/ksjaf005.html.
(Continued)

*Primary Examiner* — William V Gilbert
(74) *Attorney, Agent, or Firm* — Polson Intellectual Property Law, PC; Margaret Polson

(57) ABSTRACT

A Vacuum Insulating Glazing Unit (VIGU) comprises two or more glass lites (panes) spaced apart from one another and hermetically bonded to an edge seal assembly therebetween. The resulting cavity between the lites is evacuated to create at least one insulating vacuum cavity within which are disposed a plurality of stand-off members to maintain separation between the lites. The edge seal assembly is preferably compliant in the longitudinal (i.e., edgewise) direction to allow longitudinal relative motion between the two lites (e.g., from thermal expansion). The longitudinal compliance may be obtained by imprinting a three-dimensional pattern into the edge seal material. The edge seal assembly is preferably bonded to the lites with a first bond portion that
(Continued)

is hermetic and a second bond portion that is load-resistant. Methods for producing VIGUs and/or compliant edge seal assemblies and VIGU and edge seal apparatus are disclosed.

20 Claims, 17 Drawing Sheets

Related U.S. Application Data

(60) Provisional application No. 61/482,701, filed on May 5, 2011.

(51) Int. Cl.
    *E04C 2/34*        (2006.01)
    *E04C 2/54*        (2006.01)
    *E06B 3/66*        (2006.01)
    *B23K 1/06*        (2006.01)
    *B32B 37/06*      (2006.01)
    *B32B 38/18*      (2006.01)
    *E06B 3/663*      (2006.01)

(52) U.S. Cl.
    CPC ............ *B32B 38/1858* (2013.01); *E04C 2/34* (2013.01); *E04C 2/54* (2013.01); *E06B 3/6612* (2013.01); *E06B 3/66328* (2013.01); *E06B 3/66357* (2013.01); *E06B 3/6775* (2013.01); *B32B 2310/028* (2013.01); *B32B 2311/00* (2013.01); *B32B 2315/08* (2013.01); *E06B 2003/66395* (2013.01); *Y02B 80/24* (2013.01)

(58) Field of Classification Search
    CPC . E06B 2003/66395; B23K 1/06; B32B 37/06;
                B32B 38/1858; B32B 2310/028; B32B
                2311/00; B32B 2315/08; E04C 2/34;
                            E04C 2/54; Y02B 80/24
    USPC .... 52/204, 593, 599, 786.1, 786.13, 745.15;
                    277/644, 648, 649; 428/34; 53/405, 408
    See application file for complete search history.

(56) References Cited

U.S. PATENT DOCUMENTS

| | | |
|---|---|---|
| 2,200,694 A | 5/1940 | Gerecke et al. |
| 2,219,573 A | 10/1940 | Fraenckel |
| 2,274,999 A | 3/1942 | Allen |
| 2,279,168 A | 5/1942 | Kalischer et al. |
| 2,284,151 A | 5/1942 | Kingston |
| 2,369,146 A | 2/1945 | Kingston |
| 2,480,453 A | 8/1949 | Gerardus et al. |
| 2,502,855 A | 4/1950 | Kingston |
| 2,584,354 A | 2/1952 | Kissinger et al. |
| 2,670,572 A | 3/1954 | Smith |
| 2,753,073 A | 7/1956 | Faulkner |
| 2,933,423 A | 4/1960 | Brookover et al. |
| 2,968,125 A | 1/1961 | Montgomery et al. |
| 3,027,607 A | 4/1962 | Lehr et al. |
| 3,057,747 A * | 10/1962 | Hargreaves .......... B23K 35/262 118/400 |
| 3,103,067 A * | 9/1963 | Dixon ...................... B23K 1/06 228/124.1 |
| 3,345,218 A | 10/1967 | Brookover et al. |
| 3,389,522 A | 6/1968 | Hordis |
| 3,394,512 A | 7/1968 | Lehr et al. |
| 3,519,496 A | 7/1970 | Finn et al. |
| 3,526,550 A | 9/1970 | Larson et al. |
| 3,537,944 A | 11/1970 | Grubb et al. |
| 3,737,308 A | 6/1973 | Iwai et al. |
| 3,902,883 A | 9/1975 | Bayer |
| 4,069,630 A | 1/1978 | Chess et al. |
| 4,149,910 A | 4/1979 | Popplewell |
| 4,468,423 A | 8/1984 | Hall |
| 4,705,585 A | 11/1987 | Kelly et al. |
| 4,798,695 A | 1/1989 | Redel |
| 5,370,913 A | 12/1994 | Lin |
| 5,443,871 A | 8/1995 | Lafond |
| 5,491,953 A | 2/1996 | Lafond |
| 5,525,430 A | 6/1996 | Chahroudi |
| 5,811,926 A | 9/1998 | Novich |
| 5,834,891 A | 11/1998 | Novich |
| 6,171,703 B1 | 1/2001 | Haluska |
| 6,541,084 B2 | 4/2003 | Wang |
| 6,558,494 B1 | 5/2003 | Wang |
| 6,635,321 B2 | 10/2003 | Wang et al. |
| 6,637,644 B2 | 10/2003 | Bachli |
| 6,641,689 B1 | 11/2003 | Aggas |
| 6,692,600 B2 | 2/2004 | Veerasamy |
| 6,701,749 B2 | 3/2004 | Wang et al. |
| 6,789,362 B1 | 9/2004 | Hessabi |
| 6,793,990 B1 | 9/2004 | Sakaguchi et al. |
| 6,860,075 B2 | 3/2005 | Bachli |
| 6,924,974 B2 | 8/2005 | Stark |
| 6,928,776 B2 | 8/2005 | Hornung |
| 6,946,171 B1 | 9/2005 | Aggas |
| 6,962,834 B2 | 11/2005 | Stark |
| 6,966,208 B1 | 11/2005 | Collins |
| 6,974,518 B2 | 12/2005 | Hornung |
| 7,045,181 B2 | 5/2006 | Yoshizawa |
| 7,081,178 B2 | 7/2006 | Collins |
| 7,100,343 B2 | 9/2006 | France |
| 7,114,306 B2 | 10/2006 | Minaai |
| 7,141,130 B2 | 11/2006 | Minaai |
| 7,238,546 B2 | 7/2007 | Stark |
| 7,378,798 B2 | 5/2008 | Coumans et al. |
| 7,517,712 B2 | 4/2009 | Stark |
| 7,832,177 B2 | 11/2010 | Stark |
| 7,989,040 B2 | 8/2011 | Stark |
| 8,283,023 B2 | 10/2012 | Mott et al. |
| 2002/0041424 A1 | 4/2002 | Lynam |
| 2004/0035086 A1 | 2/2004 | Minaai et al. |
| 2004/0216386 A1 * | 11/2004 | Chernoff ................ B60J 5/0405 49/502 |
| 2005/0170627 A1 * | 8/2005 | Mowry ............. H01L 23/49827 438/612 |
| 2005/0217319 A1 | 10/2005 | Yoshizawa |
| 2006/0187608 A1 | 8/2006 | Stark |
| 2006/0191215 A1 | 8/2006 | Stark |
| 2009/0019815 A1 | 1/2009 | Ensinger |
| 2009/0304956 A1 | 12/2009 | Probster et al. |
| 2009/0324858 A1 | 12/2009 | Jaeger |
| 2010/0034996 A1 * | 2/2010 | Mott ..................... E06B 3/6612 428/34 |
| 2010/0068561 A1 | 3/2010 | Rohwer et al. |
| 2010/0175347 A1 * | 7/2010 | Bettger ............... E06B 3/66371 52/788.1 |
| 2011/0059275 A1 | 3/2011 | Stark |
| 2011/0296771 A1 | 12/2011 | Miller et al. |
| 2011/0296797 A1 | 12/2011 | Stark et al. |
| 2012/0279170 A1 | 11/2012 | Francis, IV et al. |
| 2015/0024151 A1 | 1/2015 | Dai |

FOREIGN PATENT DOCUMENTS

| | | |
|---|---|---|
| EP | 0983974 A1 | 3/2000 |
| EP | 1544180 A1 | 6/2005 |
| EP | 2847409 A1 | 3/2015 |
| JP | 1998 10-297944 A | 11/1998 |
| JP | 1998 10-330134 A | 12/1998 |
| WO | 2006121954 A | 11/2006 |
| WO | 2008085325 A2 | 7/2008 |
| WO | 2010019484 A2 | 2/2010 |
| WO | 2010083476 A2 | 7/2010 |
| WO | 2013169504 A | 11/2013 |

OTHER PUBLICATIONS

Kazakov, N.F. (ed.); Diffusion Bonding of Materials; 1981; pp. 4-9, 248-257; Pergamon Press; U.S.A.
PCT: International Search Report and Written Opinion of PCT/US2009/053206 (related application); dated Feb. 17, 2010; 8 pgs.

(56) References Cited

OTHER PUBLICATIONS

PCT: International Search Report and Written Opinion of PCT/US2010/021287 (related application); dated Sep. 3, 2010; 8 pgs.
PCT: International Search Report and Written Opinion of PCT/US2010/021286 (related application); dated Sep. 16, 2010; 7 pgs.
PCT: International Preliminary Report on Patentability of PCT/US2004/002272 (related application); dated Mar. 16, 2005; 4 pgs.
PCT: International Preliminary Examination Report of PCT/US2003/007553 (related application); dated Apr. 19, 2004; 7 pgs.
PCT: International Preliminary Report on Patentability of PCT/US2005/013237 (related application); dated Apr. 18, 2007; 9 pgs.
PCT: International Preliminary Report on Patentability of PCT/US2009/053206 (related application); dated Feb. 24, 2011; 7 pgs.
PCT: International Preliminary Report on Patentability with International Preliminary Examination Report of PCT/US2010/021287 (related application); dated May 19, 2011; 8 pgs.
PCT: International Search Report and Written Opinion of PCT/US2011/038973 (related application); dated Mar. 2, 2012; 8 pgs.
PCT: International Preliminary Report on Patentability with International Preliminary Examination Report of PCT/US2006/017595(related application); dated Aug. 24, 2012; 11 pgs.
PCT: International Search Report and Written Opinion of PCT/US2012/036693 (related application); dated Jul. 26, 2012; 7 pgs.
PCT: International Preliminary Report on Patentability Chapter I of PCT/US2011/038973 (related application); dated Dec. 13, 2012; 5 pgs.
Arata et al. Pressure and Field Assisted Bonding of Glass to Aluminum; Transactions of JWRI is published by Welding Research Institute of Osaka University; vol. 13; No. 1; 1984; pp. 35-40.
Carpenter Specialty Alloys: Controlled-Expansion Alloys (Catalog/Brochure); Dec. 1999; pp. 1-24 (esp. 5-8); Carpenter Technology Corporation (Publ.); Wyomissing, PA USA.
Cerjak, H. (ed.); Mathematical Modelling of Weld Phenomena 5; Diffusion Bonding of Glass to Metal in an Electrostatic Field; M. Morsy et al.; pp. 945-959; London IOM Communications, 2001.
Doron Teomim, Avner Badihi, Gil Zilber; "An innovative approach to wafer-level MEMS packaging"; Solid State Technology (Magazine); Jan. 2002; Penwell (Publ.); Nashua, NH USA.
Dunkerton; TWI Knowledge Summary Diffusion Bonding; Copyright 2001; TWI World Centre for Materials Joinging Technology Website; www.twi.co.uk; United Kingdom; 4 pages.
George S. Brady, et al., Materials Handbook, 12th Edition; 1986; pp. 28-29; McGraw-Hill Book Company; New York.
JPL Technology Reporting Office; "Hermetic Wafer Bonding by Use of Microwave Heating"; NASA Tech Brief, vol. 25, No. 5, from JPL New Technology Report NPO-20608 (NASA Contract No. NAS-7-918); May 1, 2001; Jet Propulsion Laboratory, California Institute of Technology (Publ.); Pasedena, CA, USA; including therein: NTR Inventors Report by Henry W Jackson, John D Mai, Martin B Barmatz, Nasser K Budraa, William T Pike; NASA Case No. 0205 20608; Mar. 1997(?) (Best Available Copy); including therein: (same authors) "Low Pressure and Low Temperature Hermetic Wafer Bonding Using Microwave Heating"; Jet Propulsion Laboratory, California Institute of Technology; Pasedena, CA, USA (Best Available Copy).
Kazakov et al.; Equipment for Diffusion Welding of Rectangular Glass Plates to Kovar; Svarochnoe Proizvodstvo; Jun. 1977; p. 50; (In Russian, English translation provided).
Nicholas, M.G. & Lee, R. J.; Joining Dissimilar Materials, Metals and Materials, The Journal of the Institute of Metals, vol. 5, No. 6, Jun. 1989; UK.
NTR Inventors Report by Henry W Jackson, John D Mai, Martin B Barmatz, Nasser K Budraa, William T Pike; NASA Case No. 0205 20608; Mar. 1997(?) (Best Available Copy); Including therein: (same authors) "Low Pressure and Low Temperature Hermetic Wafer Bonding Using Microwave Heating"; Jet Propulsion Laboratory, California Institute of Technology; Pasadena, CA, USA (Best Available Copy).
Ostyn, K. & Vinckier, A.; Joining of Different Materials Through Interfaces; Interfaces in Materials, Proceedings of the Colloquium; pp. 153-173; Brussels, Dec. 1988.
PCT: International Search Report of PCT/US03/07553 (related application); International Publication No. WO 03/083938 A1; dated Jun. 16, 2003; 2 pgs.
PCT: International Search Report of PCT/US04/02272 (related application); International Publication No. WO 2004/068189; dated Jan. 27, 2004; 1 pg.
R.C. Dykhuizen et al.; Gas Dynamic Principles of Cold Spray; Journal of Thermal Spray Technology; vol. 7(2); pp. 205-212; Jun. 1998.
Sadovsky et al.; Precision Welding of Glass to Kovar Without Melting; Svarochnoe Proizvodstvo; Feb. 1973; pp. 22; (In Russian, English translation provided).
PCT: Written Opinion of the International Searching Authority of PCT/US04/02272 (related application); International Publication No. WO 2004/068189; dated Mar. 16, 2005; 3 pgs.
PCT: International Search Report of PCT/US05/13237 (related application); International Publication No. WO 2005/118291 A3; dated Oct. 24, 2006; 1 pg.
PCT: Written Opinion of the International Searching Authority of PCT/US05/13237 (related application); International Publication No. WO 2005/118291; dated Oct. 24, 2006; 5 pgs.
PCT: International Search Report of PCT/US06/17595 (related application); International Publication No. WO 2006/121954; dated Aug. 20, 2008; 3 pgs.
PCT: Written Opinion of the International Searching Authority of PCT/US06/17595 (related application); International Publication No. WO 2006/121954; dated Aug. 20, 2008; 10 pgs.
PCT: International Search Report of PCT/US08/76278 (related application); dated Jan. 16, 2009; 4 pgs.
PCT: Written Opinion of the International Searching Authority of PCT/US08/76278 (related application); dated Jan. 16, 2009; 5 pgs.
PCT: International Preliminary Report on Patentability of PCT/US2008/076278 (related application); dated Mar. 25, 2010.
PCT: International Search Report and Written Opinion of PCT/US2016/17626 (related application), dated Apr. 22, 2016, 47 pages.
PCT: International Preliminary Report on Patentability of PCT/US2014/061280 (related application); dated Apr. 19, 2016; 5 pgs.

* cited by examiner

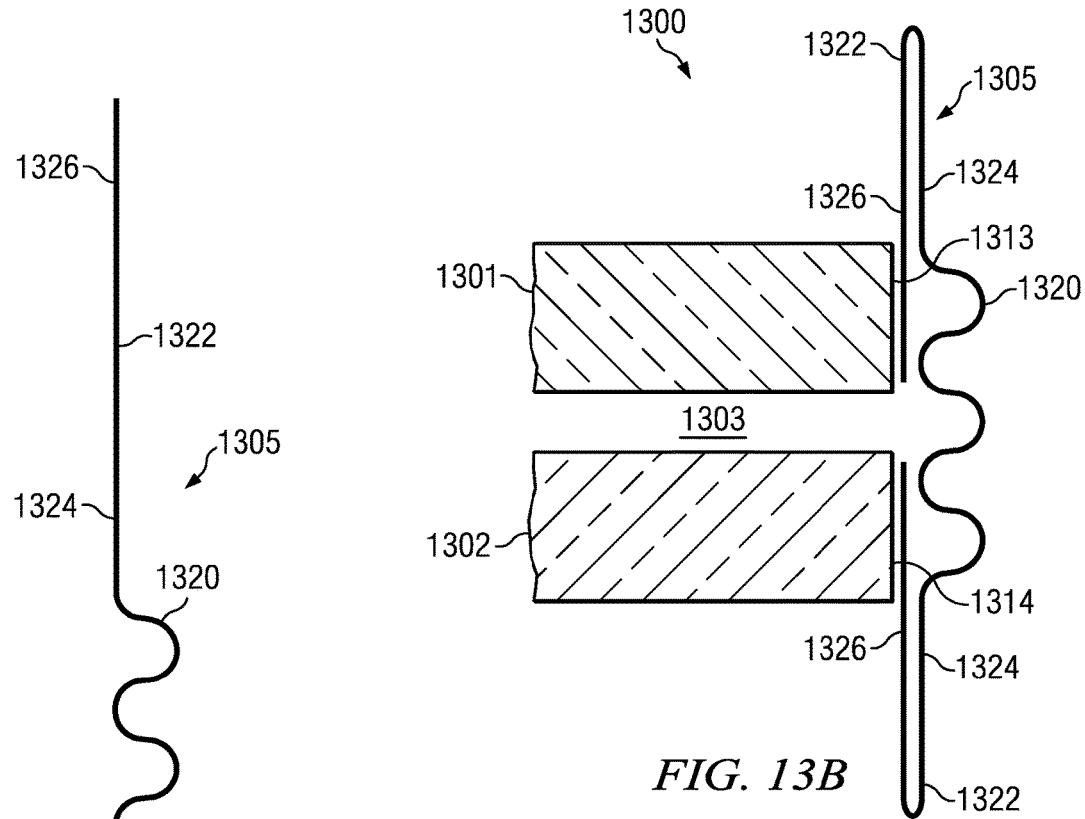
FIG. 13B
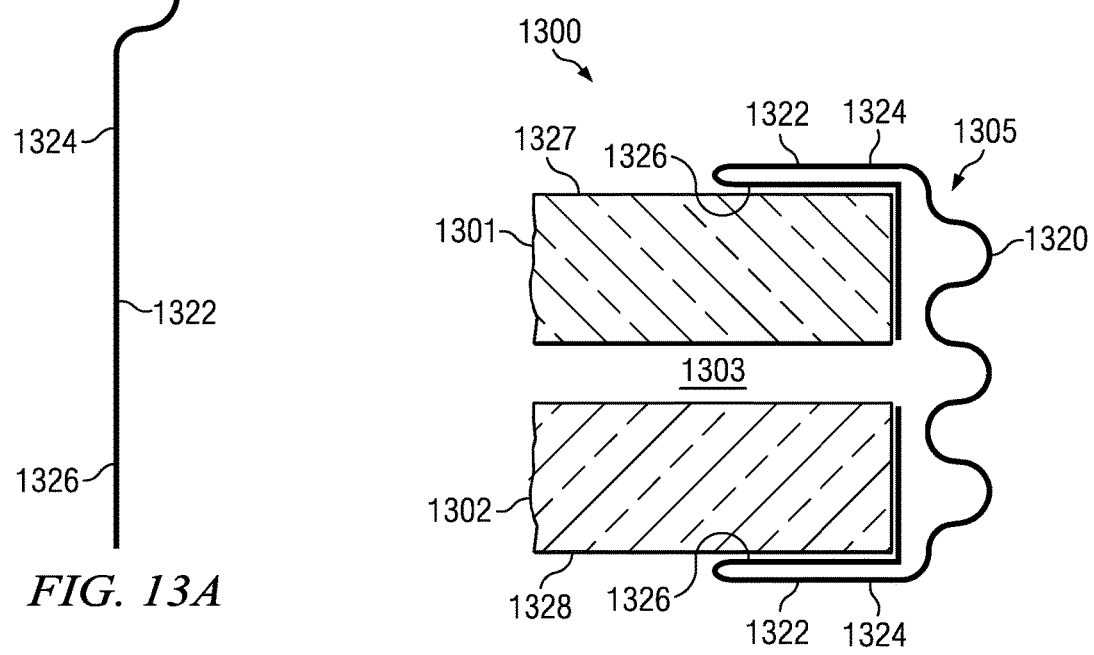
FIG. 13A
FIG. 13C ent oriented along the length of any portion of the edge seal is herein defined as the longitudinal component and the motion component oriented at a right angle (i.e., normal) to the longitudinal component and parallel to the planes of the lites is herein defined as the lateral component. At any given point around the perimeter of the IGU/VIGU assembly, there are generally longitudinal and lateral components of relative motion between the lites at any given time. The relative motion is believed to be largest near the corners in the case of a rectangular IGU/VIGU. A need therefore exists, for an edge seal that offers compliance in both the longitudinal and lateral directions.

METHOD AND APPARATUS FOR AN INSULATING GLAZING UNIT AND COMPLIANT SEAL FOR AN INSULATING GLAZING UNIT

CROSS-REFERENCE TO RELATED APPLICATIONS

This application is a Continuation of U.S. patent application Ser. No. 13/464,951, filed on May 4, 2012, entitled METHOD AND APPARATUS FOR AN INSULATING GLAZING UNIT AND COMPLIANT SEAL FOR AN INSULATING GLAZING UNIT, which published as U.S. Application Publication No. 2012-0279170 on Nov. 8, 2012. U.S. application Ser. No. 13/464,951 claims benefit of U.S. Provisional Application No. 61/482,701, filed on May 5, 2011, entitled INSULATING GLAZING UNIT AND COMPLIANT SEAL FOR AN INSULATING GLAZING UNIT. U.S. application Ser. Nos. 13/464,951 and 61/482,701, and U.S. Application Publication No. 2012-0279170 are incorporated by reference herein in their entirety.

This Invention was made with government support under Contract No. DE-EE0004024 awarded by the Department of Energy. The Government has certain rights in this invention.

TECHNICAL FIELD

The following disclosure relates generally to insulating glazing apparatus (including insulated glazing units and vacuum insulating glazing units) having spaced-apart glazing panes. More specifically, it relates to insulating glazing apparatus having compliant seals for providing an airtight seal between the spaced-apart panes of an insulating glazing apparatus, apparatus comprising such seals, and methods for manufacture of same.

BACKGROUND

Insulating glazing units (IGUs) comprise two or more glass lites (panes) separated by one or more volumes which are sealed and then filled with an insulating gas mixture and/or partially evacuated to create at least one insulating cavity. Vacuum insulating glazing units (VIGUs) comprise two or more glass lites separated by one or more volumes which are sealed and evacuated to create at least one insulating vacuum cavity. The volume between the lites is sealed around its perimeter (or edge) by an edge seal. The edge seal is a part (or assembly of parts) that is bonded to one lite, spans across the gap between the two lites, and is bonded to the second lite. At any time after the IGU/VIGU has been assembled, the first lite may have a difference in temperature from the second lite. The temperature difference leads to differential expansion or contraction and, therefore, relative motion between the glass lites. A rigid edge seal strongly resists the relative motion between the lites, thereby creating a buildup of thermal stresses within the IGU/VIGU assembly. A need therefore exists, for a compliant edge seal that permits relative motion between the glass lites, thereby reducing the stresses created in the IGU/VIGU assembly due to thermal distortions. Minimization of the thermal stresses is desirable to prevent IGU/VIGU failure in climates where significant temperature differences between adjacent lites are encountered.

The relative motion between adjacent lites in any region along the perimeter of the IGU/VIGU can be broken into two components, both of which are oriented parallel to the planes of the lites. The relative motion normal to the planes of the lites is relatively small, and is therefore not included. The two components parallel to the planes of the lites are herein defined relative to the edge seal. The motion component oriented along the length of any portion of the edge seal is herein defined as the longitudinal component and the motion component oriented at a right angle (i.e., normal) to the longitudinal component and parallel to the planes of the lites is herein defined as the lateral component. At any given point around the perimeter of the IGU/VIGU assembly, there are generally longitudinal and lateral components of relative motion between the lites at any given time. The relative motion is believed to be largest near the corners in the case of a rectangular IGU/VIGU. A need therefore exists, for an edge seal that offers compliance in both the longitudinal and lateral directions.

The edge seal for an IGU/VIGU is generally constructed of a thin sheet of material. For VIGUs, the edge seal must be hermetic, and thus is generally constructed of a thin hermetic sheet of material. The sheet material is formed in some fashion around the edge of the IGU/VIGU. The geometry of the edge seal dictates that relative motion of the lites in the longitudinal direction is largely accommodated by a shearing action of the edge seal while relative motion of the lites in the lateral direction is largely accommodated by bending of the edge seal material. Thin sheet material is relatively rigid in response to a shearing action and relatively compliant in response to a bending action. As a result, longitudinal (shear) compliance is generally more difficult to obtain than lateral (bending) compliance in an IGU/VIGU edge seal when the edge seal is formed of a thin sheet of material. A need therefore exists, for an edge seal having improved longitudinal (shear) compliance.

SUMMARY

This disclosure describes edge seals for IGUs and/or VIGUs that are highly compliant in response to longitudinal and lateral components of relative motion between the two adjacent lites attached to one another through the edge seal.

In one embodiment, an insulating glazing unit comprises a first lite formed from a hermetic transparent material and a second lite formed from a hermetic transparent material and spaced-apart from the first lite to define an insulating cavity therebetween. An edge seal is hermetically bonded between the respective edges of the first lite and the second lite, the edge seal being formed from a hermetic material. The edge seal includes a compliant region having a surface formed in a three-dimensional pattern.

In another embodiment, an insulating glazing unit comprises a first lite formed from a hermetic transparent material and a second lite formed from a hermetic transparent material that is spaced-apart from the first lite to define an insulating cavity therebetween. An edge seal assembly includes an outer member, a first inner member and a second inner member, each of the outer member, first inner member and second inner member being formed of hermetic materials. An inner surface of first inner member is hermetically bonded to an outer edge of the first lite, an inner surface of second inner member is hermetically bonded to an outer edge of the second lite, the outer surface of the first inner member is hermetically bonded to a first inner edge of the outer member, and the outer surface of the second inner member is hermetically bonded to a second inner edge of the outer member. The edge seal includes a compliant region having a surface formed in a three-dimensional pattern.

In another embodiment, a method of manufacturing an insulating glazing unit is provided. The method comprises the following steps: a) providing a length of first inner member, wrapping the length of inner member around a first lite, cutting and joining the first inner member to itself at the location where it would otherwise overlap itself, and joining the first inner member to the edge of the first lite where it is coincident after wrapping; b) providing a length of second inner member, wrapping the length of inner member around a second lite, cutting and joining the second inner member to itself at the location where it would otherwise overlap itself, and joining the second inner member to the edge of the second lite where it is coincident after wrapping; c) positioning the first lite and the second lite in a spaced-apart configuration forming an insulating cavity; d) providing a length of an outer member having a compliant region with a three-dimensional surface pattern, wrapping the outer member around the assembly of first and second lites and first and second inner members, cutting and joining the outer member to itself at the location where it would otherwise overlap itself and joining the outer member to each one of the inner members to form a pair of continuous seals; and e) evacuating the insulating cavity and sealing the insulating cavity.

BRIEF DESCRIPTION OF THE DRAWINGS

For a more complete understanding, reference is now made to the following description taken in conjunction with the accompanying drawings in which:

FIGS. 3a and 3b are enlarged perspective views of the compliant region of the edge seal of FIG. 2, wherein FIG. 3a shows the unstressed (un-deformed) state and FIG. 3b shows the shear (i.e., longitudinally) deformed shape;

FIGS. 13a, 13b, 13c and 13d are cross-sectional side views of a VIGU/IGU in accordance with another embodiment having a single piece edge seal; FIG. 13a showing the edge seal after formation of the three-dimensional pattern, FIG. 13b showing the edge seal positioned adjacent the two glass panes for a first bond, FIG. 13c showing the edge seal positioned adjacent the two glass panes for a second bond and FIG. 13d showing the completed VIGU/IGU;

FIG. 14a showing the edge seal after formation of the three-dimensional pattern, FIG. 14b showing the edge seal positioned adjacent the two glass panes for a first bond, FIG. 14c showing the edge seal positioned adjacent the two glass panes for a second bond and FIG. 14d showing the completed VIGU/IGU;

FIG. 19a showing the metal edge band being extended from a supply reel, FIG. 19b showing the fabrication of the edge seal end, FIG. 19c showing the welding of the edge band; FIG. 19d showing the stretching/positioning of the edge band and FIG. 19e showing the glass pane with the edge band attached.

DETAILED DESCRIPTION

Figure 1:
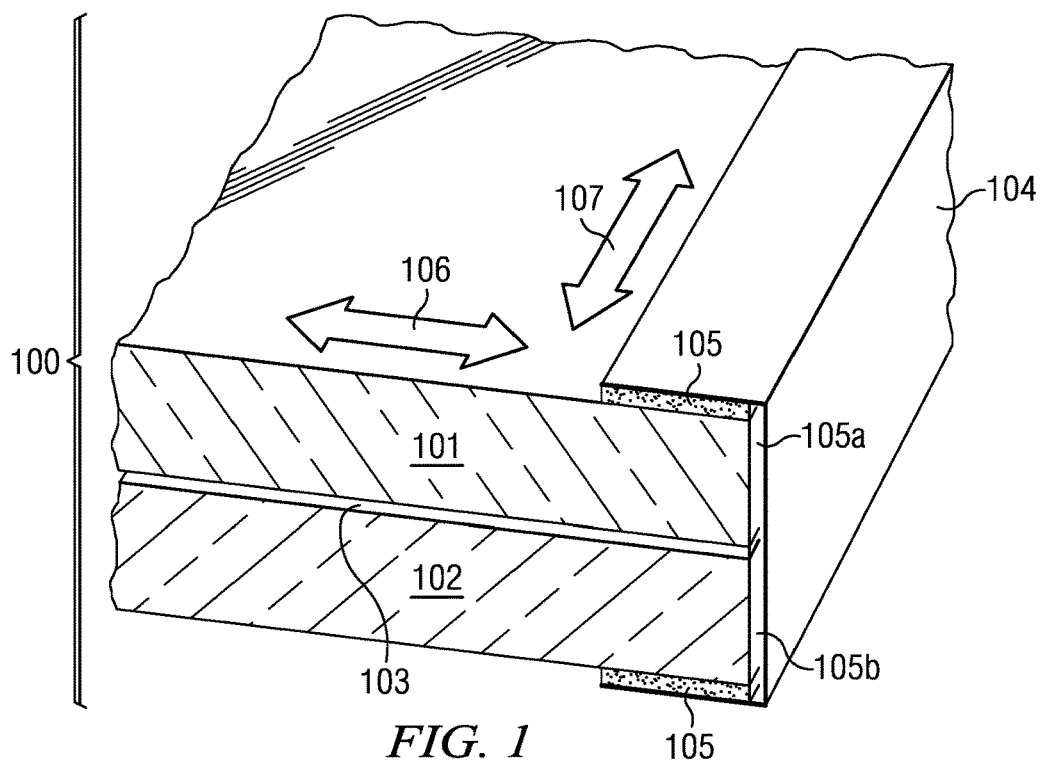
FIG. 1 is a cross-sectional perspective view of a VIGU/IGU having an edge seal.

Referring now to the drawings, wherein like reference numbers are used herein to designate like elements throughout, the various views and embodiments of a method and apparatus for an insulating glazing unit and compliant seal for an insulating glazing unit are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

For purposes of this application, the term "hermetic" as applied to a material or a seal shall mean (unless otherwise specifically denoted) that, when used to form a sealed cavity and subjected to a pressure differential of approximately one atmosphere (i.e., in air), the material or seal has a permeability or "leak rate" that is sufficiently low such that the internal pressure within the sealed cavity changes by less than 1 mtorr (i.e., $1 \times 10^{-3}$ torr) over a period of at least ten years, and preferably over a period of 30-40 years. For example, if the initial pressure within the sealed cavity is $1 \times 10^{-4}$ torr, the materials and/or seals forming the cavity would be considered hermetic for ten years if the pressure within the sealed cavity after ten years is still less than $1.1 \times 10^{-3}$ torr. In another example, if the initial pressure within the sealed cavity is $5 \times 10^{-5}$ torr, the materials and/or seals forming the cavity would be considered hermetic for thirty years if the pressure within the sealed cavity after thirty years is less than $1.05 \times 10^{-3}$ torr.

Referring now to FIG. 1, there is illustrated a cross-sectional view of a vacuum insulating glazing unit (VIGU). VIGU 100 comprises a first lite 101 and a second lite 102. The lites are formed from a hermetic transparent material, preferably glass. Lites 101 and 102 are spaced-apart from one another, defining an insulating cavity 103 therebetween. A plurality of stand-off members or "spacers" (not shown) may be positioned in the cavity 103 between the lites 101 and 102 to maintain separation of the lites. The stand-off members may be affixed to one or both of the lites 101, 102 or held in place by other means, e.g., suspended on fibers or held in position by friction between the lites. The stand-off members may be formed of glass, ceramic, metal or other materials having high compression strength and little or no out-gassing. An edge seal 104 is hermetically bonded between the respective edges of first lite 101 and second lite 102 using a hermetic joining material 105. In the embodiment shown, the edge seal 104 is bonded to the upper surface of first lite 101 and to the lower surface of second lite 102. In an alternative embodiment, the edge seal 104 is hermetically bonded to the upper front edge of first lite 101 (e.g., in the area denoted 105a) and to the lower front edge of second lite 102 (e.g., in the area denoted 105b). In another alternative embodiment, the edge seal 104 is hermetically bonded directly to the lites 101 and 102 such that joining material 105 is not necessary. The edge seal 104 is formed from a hermetic material, preferably a foil or thin sheet of metal or metal alloy. Lateral motion of lite 101 relative to lite 102 is denoted by the arrow 106, and longitudinal motion of lite 101 relative to lite 102 is denoted by the arrow 107. In a VIGU, the insulating cavity is evacuated to a vacuum. In one embodiment, the hermetic materials are hermetic for at least ten years. In another embodiment, the hermetic materials are hermetic for at least thirty years. In yet another embodiment, the hermetic materials are hermetic for at least forty years. In a preferred embodiment, the insulating cavity is evacuated to a vacuum within the range from $1 \times 10^{-6}$ torr to $1 \times 10^{-3}$ torr. Alternatively, an insulating glazing unit (IGU) (not shown) may be constructed in a substantially identical fashion, except the materials and seals need not be hermetic and the atmosphere within the insulating cavity is a partial vacuum and/or filled with an insulating gas or gas mixture. The evacuation, partial evacuation or (in the case of IGUs) filling with insulating gasses of the insulating cavity may be achieved by sealing the insulating cavity while the VIGU/IGU is in, respectively, a vacuum chamber, a partial vacuum chamber or a gas-filled chamber. Alternatively, the evacuation and/or filling may be achieved after the insulating cavity has been sealed via an evacuation port (also called a "pinch-off tube" or "pump-out tube") in communication with the insulating cavity.

Figure 2:
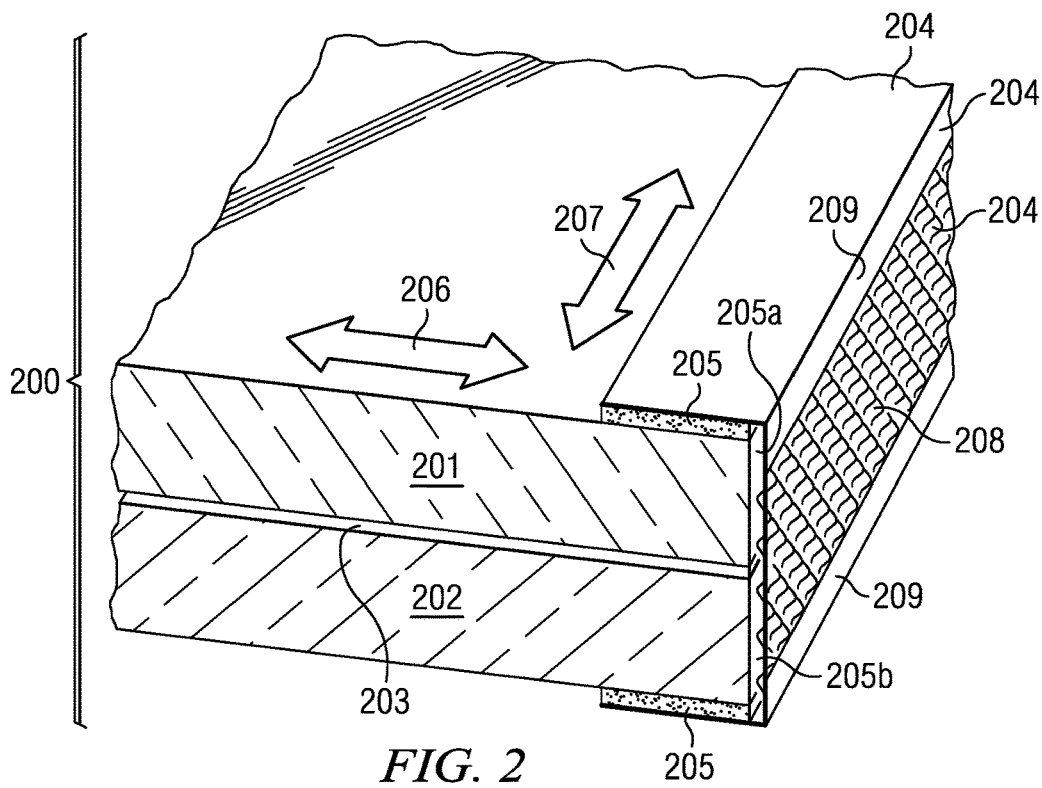
FIG. 2 is a cross-sectional perspective view of a VIGU/IGU having an edge seal with a compliant region including a three dimensional pattern imprinted thereon in accordance with another embodiment.

Referring now to FIG. 2, there is illustrated a cross-sectional view of a VIGU in accordance with one embodiment. Except as noted below, VIGU 200 is generally similar to VIGU 100 shown in FIG. 1, comprising a first lite 201, a second lite 202, an insulating cavity 203 therebetween and an edge seal 204 bonded between the respective edges of first lite 201 and second lite 202 using a hermetic joining material 205. The lites 201 and 202 are formed from a hermetic transparent material, preferably glass. A plurality of stand-off members (not shown) may be positioned in the cavity 203 between the lites 201 and 202 to maintain separation of the lites. The stand-off members may be affixed to one or both of the lites 201, 202 or held in place by other means. The stand-off members may be formed of glass, ceramic, metal or other materials having high compression strength and little or no out-gassing. The edge seal 204 is formed from a hermetic material, preferably a foil or thin sheet of metal or metal alloy. In the embodiment shown, the edge seal 204 is bonded to the upper surface of first lite 201 and to the lower surface of second lite 202. In an alternative embodiment, the edge seal 204 is hermetically bonded to the upper front edge of first lite 201 (e.g., in the area denoted 205a) and to the lower front edge of second lite 202 (e.g., in the area denoted 205b). In another alternative embodiment, the edge seal 204 is hermetically bonded directly to the lites 201 and 202 such that joining material 205 is not necessary.

The edge seal 204 of VIGU 200 includes a compliant region 208 having a surface formed in a three-dimensional pattern. The three-dimensional pattern of the compliant region 208 may be formed by imprinting, stamping, embossing, roll-forming or other known methods of metal-forming. The compliant region 208 provides greater compliance to the edge seal 204 to accommodate relative motion between the lites 201 and 202 in the lateral direction (denoted by arrow 206) and/or in the longitudinal directions (denoted by arrow 207), as compared to edge seals without the three-dimensional compliant region. This greater compliance may result in a reduction of thermally-induced stress in the lites 201 and 202, e.g., in the area where the edge seal 204 is bonded to the lites, as well as in the compliant edge seal itself. In the embodiment illustrated in FIG. 2, the compliant region 208 of the edge seal is bounded on two sides by relatively flat, longitudinally-oriented regions 209 of the edge seal lying substantially in the same plane as the compliant region. In a VIGU, the insulating cavity is evacuated to a vacuum. In one embodiment, the hermetic materials are hermetic for at least ten years. In another embodiment, the hermetic materials are hermetic for at least thirty years. In yet another embodiment, the hermetic materials are hermetic for at least forty years. In a preferred embodiment, the insulating cavity is evacuated to a vacuum within the range of $1 \times 10^{-6}$ torr to $1 \times 10^{-3}$ torr. Alternatively, an insulating glazing unit (IGU) (not shown) may be constructed in a substantially identical fashion, except the materials and seals need not be hermetic and the atmosphere within the insulating cavity is a partial vacuum and/or filed with an insulating gas or gas mixture. As describe above, the evacuation, partial evacuation or (in the case of IGUs) filling with insulating gasses of the insulating cavity may be achieved at the time of sealing the insulating cavity by sealing it while the VIGU/IGU is in, respectively, a vacuum chamber, a partial vacuum chamber or a gas-filled chamber. Alternatively, the evacuation and/or filling of the insulating cavity may be achieved after the insulating cavity has been sealed via an evacuation port.

Figure 3A:
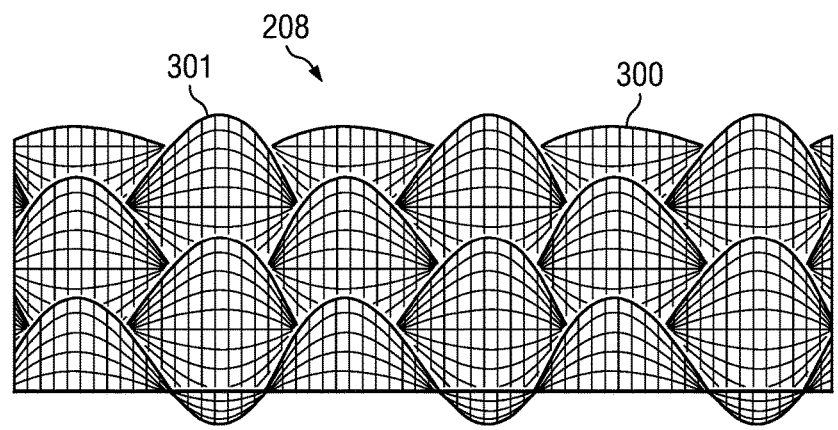
Figure 3B:
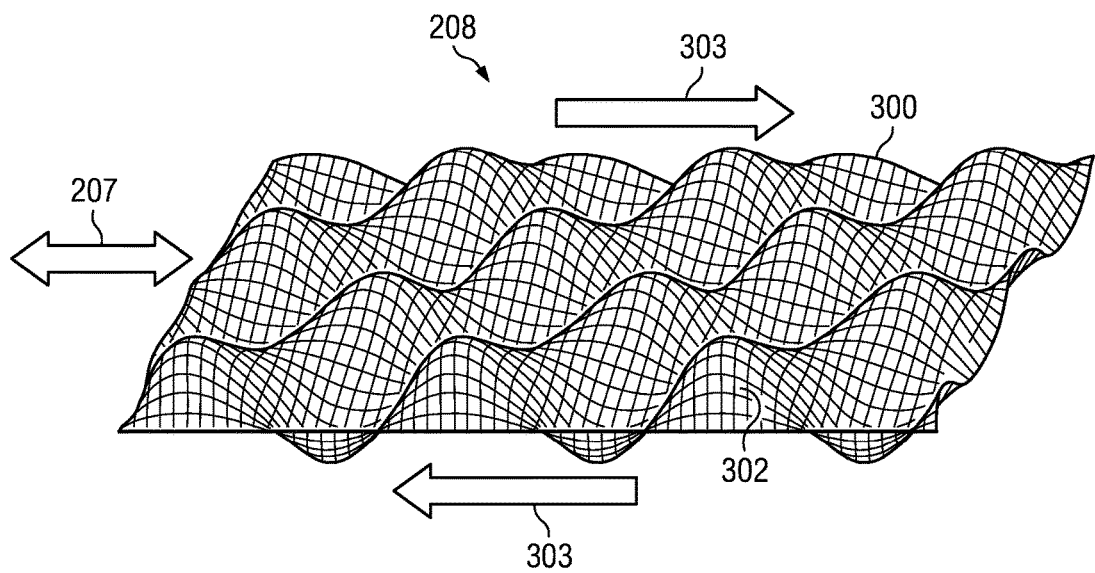

Referring now to FIGS. 3a and 3b, there is illustrated an enlarged portion of the compliant region 208 of edge seal 204, showing how a sheet material 300 having a three-dimensional imprinted pattern accommodates shear deformation largely through bending of the three-dimensional sheet material rather than extension (i.e., overall stretching) of the sheet material. In other words, as the three-dimensional sheet material is subjected to stresses, the three-dimensional contours of the sheet material can bend in localized areas (e.g., at the junctions between the "hills" and "valleys" of the pattern) from their initial configuration into a longer, flatter configuration in regions subjected to tension and into a shorter, more contoured configuration in regions subjected to compression.

Specifically, FIG. 3a shows compliant region 208 in a non-deformed (i.e., unloaded) shape 301, whereas FIG. 3b shows compliant region 208 being deformed into a shear-deformed shape 302 by the application of loads in opposite directions (denoted by arrows 303). In this embodiment, the arrows 303 indicate a loading direction consistent with relative motion between lites 201 and 202 in the longitudinal direction 207; however, loading in the lateral direction or in both directions is possible. It will be appreciated that the contour lines appearing in FIGS. 3a and 3b are for purposes of illustration, i.e., to allow visualization of the surface contours of compliant region 208, and do not represent actual indicia or structures on the sheet material 300. If for use in a VIGU, the sheet material 300 is formed from a hermetic material, preferably a foil or thin sheet of metal or metal alloy. In one embodiment, the hermetic materials are hermetic for at least ten years. In another embodiment, the hermetic materials are hermetic for at least thirty years. In yet another embodiment, the hermetic materials are hermetic for at least forty years. If for use in an IGU, the sheet material 300 need not be a hermetic material.

Figure 4A:
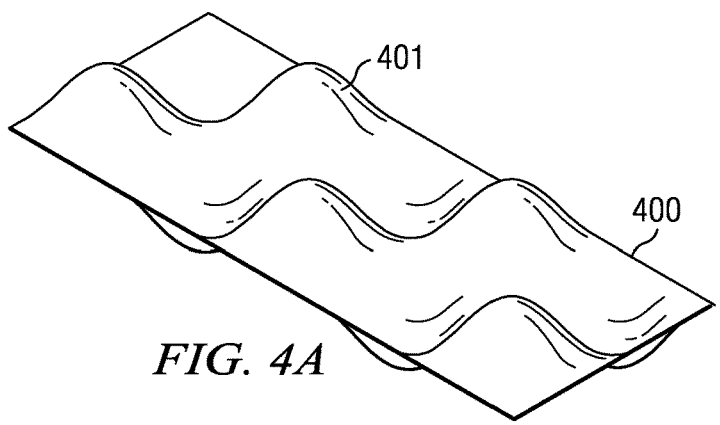
FIGS. 4a and 4b are perspective and side views, respectively, of the compliant region of FIG. 2.
Figure 4B:
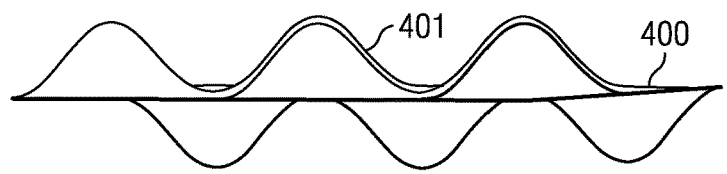

Referring now to FIGS. 4a and 4b, there is further illustrated a sheet material 400 having a three-dimensional imprinted pattern 401 suitable for use on the compliant region 208 of edge seal 204. Specifically, FIG. 4a is an isometric view of the sheet material 400 and FIG. 4b is a side view of the sheet material 400 having the same pattern 401.

Figure 5A:
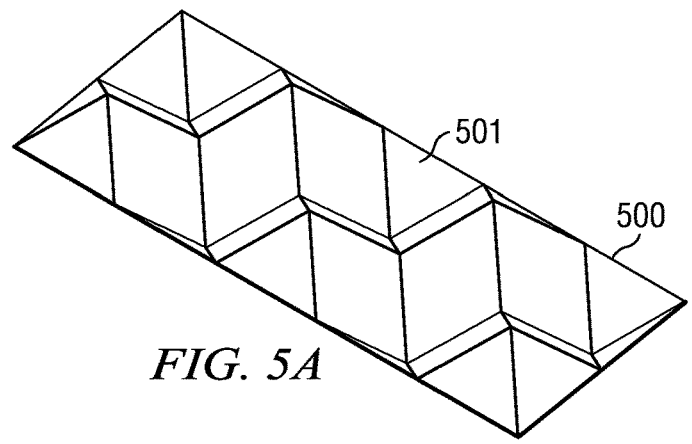
FIGS. 5a and 5b are perspective and side views, respectively, of an alternative three-dimensional pattern for a compliant region in accordance with another embodiment.
Figure 5B:
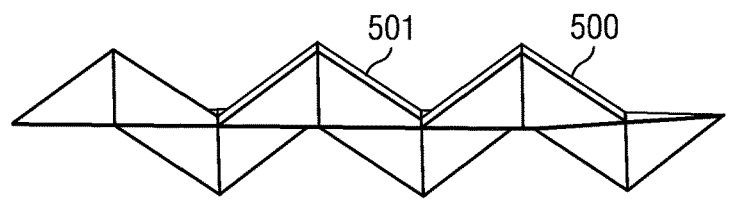

Referring now to FIGS. 5a and 5b, there is illustrated an alternative sheet material 500 having a three-dimensional imprinted pattern 501 suitable for use on the compliant region 208 of edge seal 204. Specifically, FIG. 5a is an isometric view of the sheet material 500 and FIG. 5b is a side view of the sheet material 500 having the same pattern 501.

Figure 6A:
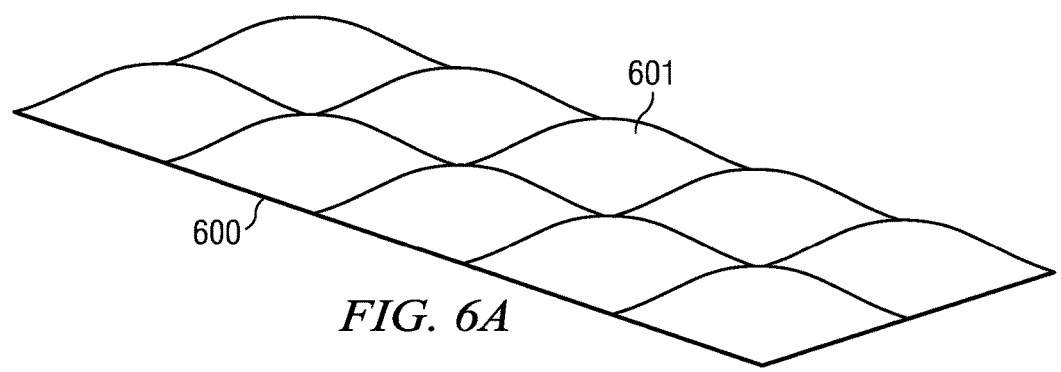
FIGS. 6a and 6b are perspective and side views, respectively, of an alternative three-dimensional pattern for a compliant region in accordance with yet another embodiment.
Figure 6B:
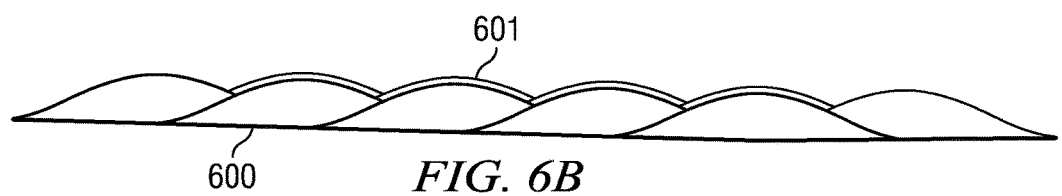

Referring now to FIGS. 6a and 6b, there is illustrated another alternative sheet material 600 having a three-dimensional imprinted pattern 601 suitable for use on the compliant region 208 of edge seal 204. Specifically, FIG. 6a is an isometric view of the sheet material 600 and FIG. 6b is a side view of the sheet material 600 having the same pattern 601.

Figure 7A:
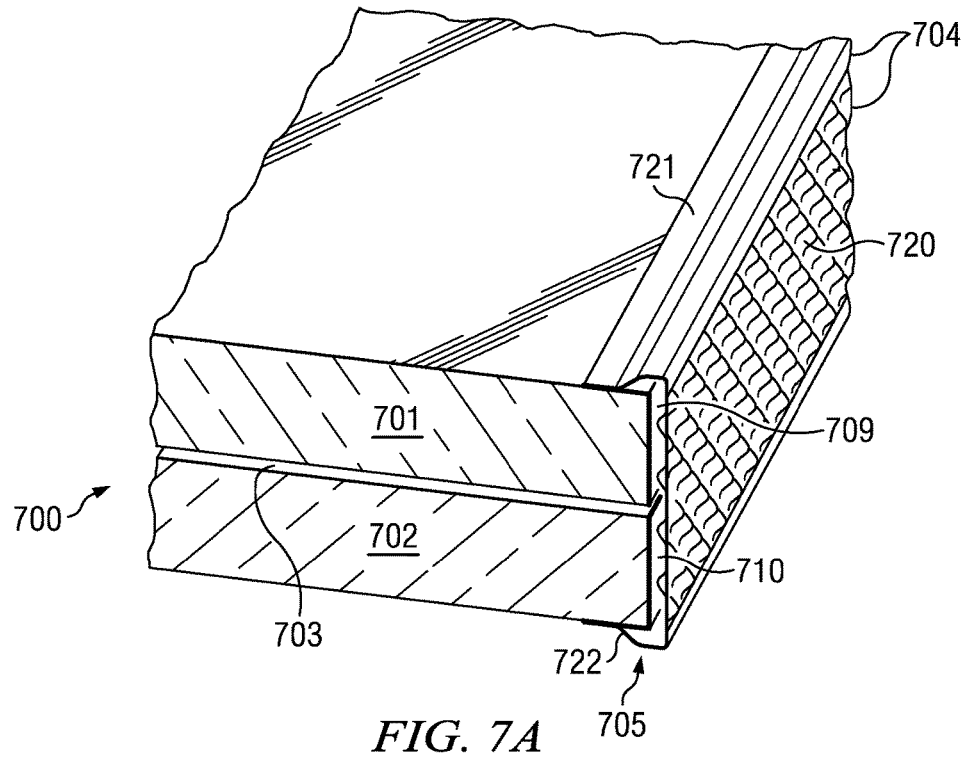
FIGS. 7a, 7b and 7c are cross-sectional perspective views of another VIGU/IGU in accordance with an apparatus and a method in accordance with additional embodiments.
Figure 7B:
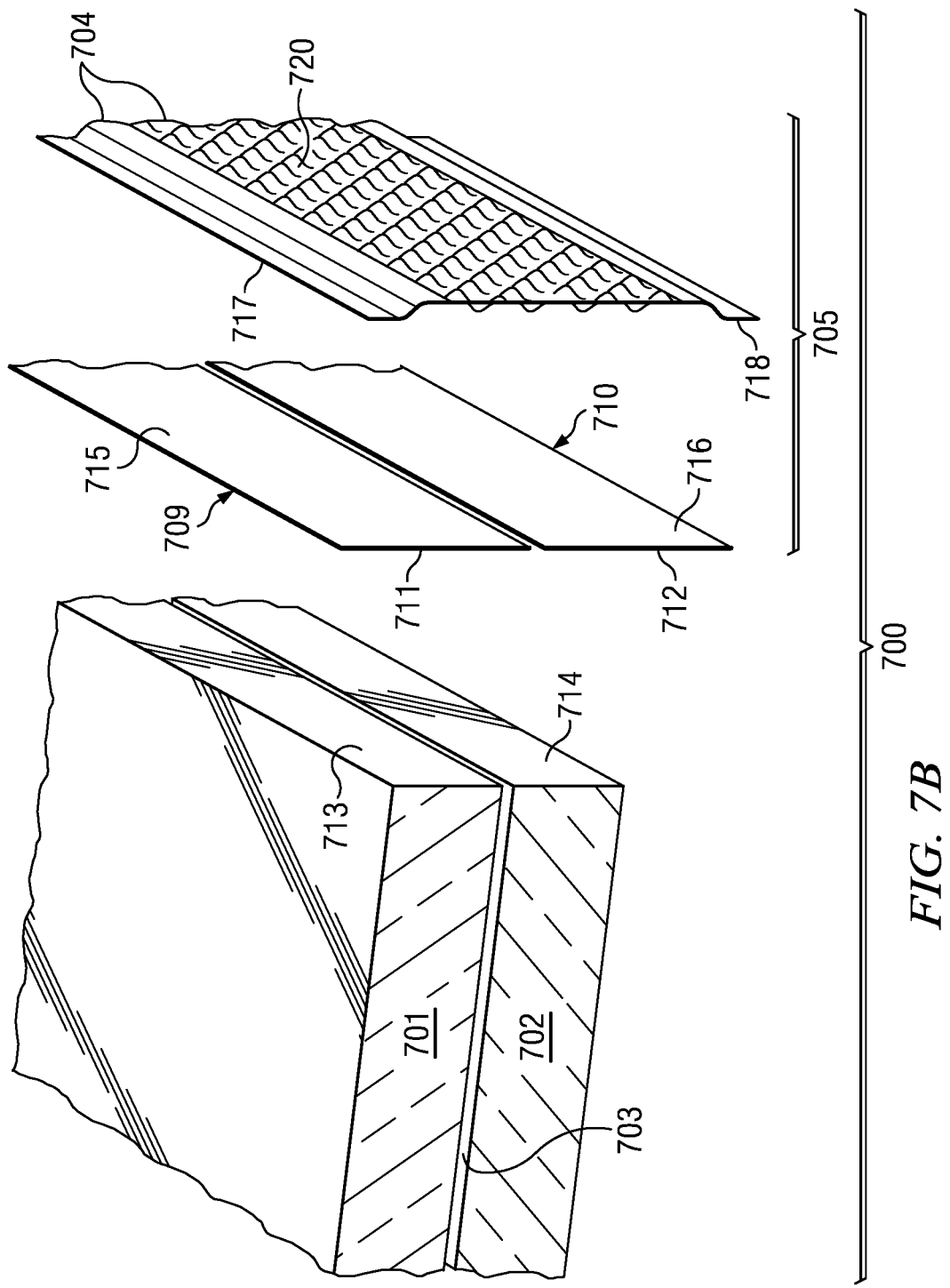
Figure 7C:
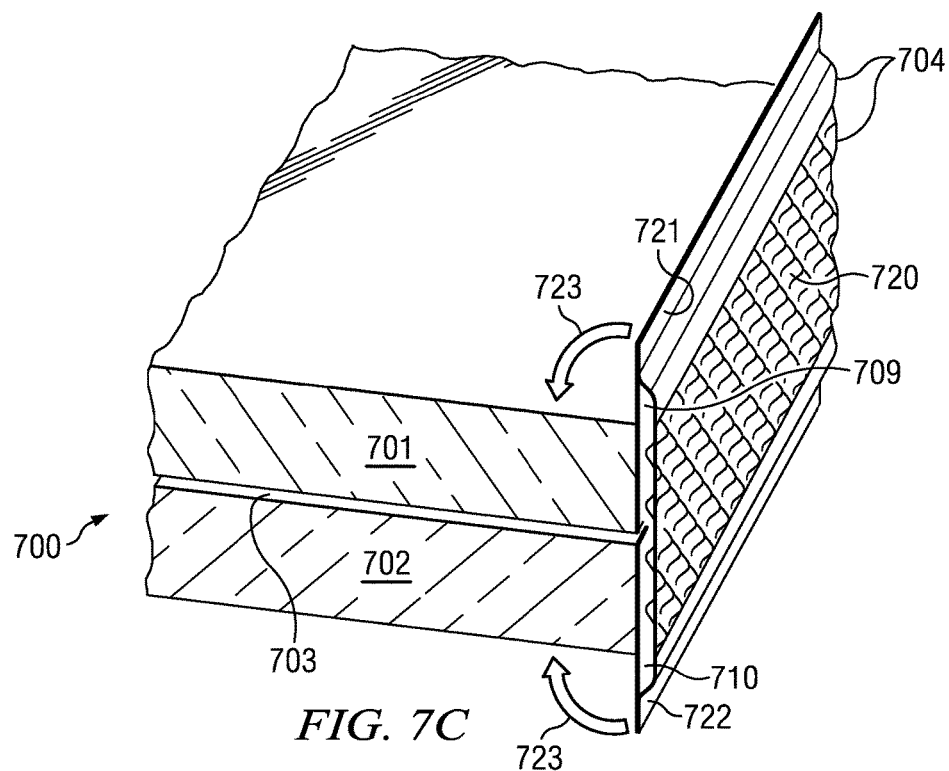

Referring now to FIGS. 7a, 7b and 7c, there is illustrated a VIGU/IGU in accordance with another embodiment and a method of obtaining longitudinal compliance using a three-dimensional patterned edge seal in accordance with yet another embodiment. Specifically, FIG. 7a shows a VIGU/IGU 700 after assembly, FIG. 7b is an exploded diagram of the components of VIGU/IGU 700 prior to assembly, and FIG. 7c shows the VIGU/IGU 700 at an intermediate stage during the assembly process. The VIGU/IGU 700 includes a first lite 701 and second lite 702 spaced apart to define an insulating (e.g., vacuum, partial vacuum or insulating gas-filled) cavity 703 disposed therebetween. A plurality of stand-off members (not shown) may be positioned in the cavity 703 between the lites 701 and 702 to maintain separation of the lites. The stand-off members may be affixed to one or both of the lites 701, 702 or held in place by other means, e.g., suspended on fibers or held in position by friction between the lites. The lites 701 and 702 are formed from a hermetic transparent material, preferably glass. The stand-off members may be formed of glass, ceramic, metal or other materials having high compression strength and little or no out-gassing. As further described below, an edge seal assembly 705 having a compliant portion is bonded between the respective edges of the two lites 701 and 702.

As best seen in FIG. 7b, the edge seal assembly 705 includes an outer member 704, a first inner member 709 and a second inner member 710. An inner surface 711 of first inner member 709 is bonded to an outer edge 713 of the first lite 701, and an inner surface 712 of second inner member 710 is bonded to an outer edge 714 of the second lite 702. In the case of a VIGU, the bonds between inner member inner surfaces 711, 712 and respective lite outer edges 713, 714 are hermetic. The outer surface 715 of the first inner member 709 is bonded to a first inner edge 717 of the outer member 704, and the outer surface 716 of the second inner member 710 is bonded to a second inner edge 718 of the outer member. In the case of a VIGU, the bonds between inner member outer surfaces 715, 716 and respective outer member inner edges 717, 718 are hermetic. The outer member 704 includes a compliant region 720 having a surface formed in a three-dimensional pattern, e.g., the three-dimensional patterns previously described in connection with FIGS. 2, 3a, 3b, 4a, 4b, 5a, 5b, 6a and/or 6b. Preferably, some or all of the edge seal elements 704, 709 and 710 are spoolable parts, meaning they may be stored in a rolled-up state on a spool until needed for assembly.

In a VIGU, the insulating cavity is evacuated to a vacuum. In one embodiment, the hermetic materials are hermetic for at least ten years. In another embodiment, the hermetic materials are hermetic for at least thirty years. In yet another embodiment, the hermetic materials are hermetic for at least forty years. In a preferred embodiment, the insulating cavity is evacuated to a vacuum within the range of $1\times10^{-6}$ torr to $1\times10^{-3}$ torr. Alternatively, an insulating glazing unit (IGU) (not shown) may be constructed in a substantially identical fashion, except the materials and seals need not be hermetic and the atmosphere within the insulating cavity is a partial vacuum and/or filed with an insulating gas or gas mixture. As describe above, the evacuation, partial evacuation or (in the case of IGUs) filling with insulating gasses of the insulating cavity may be achieved at the time of sealing the insulating cavity by sealing it while the VIGU/IGU is in, respectively, a vacuum chamber, a partial vacuum chamber or a gas-filled chamber. Alternatively, the evacuation and/or filling of the insulating cavity may be achieved after the insulating cavity has been sealed via a pinch-off tube or pump-out tube.

As best seen in FIG. 7c, after bonding the inner surface 711 of first inner member 709 to the outer edge 713 of the first lite 701, the inner surface 712 of second inner member 710 to the outer edge 714 of the second lite 702, the outer surface 715 of the first inner member 709 to the first inner edge 717 of the outer member 704, and the outer surface 716 of the second inner member 710 to the second inner edge 718 of the outer member, the flange portions 721, 722 of the edge seal assembly 705 may be folded back approximately 90 degrees (as denoted by arrows 723) such that they lie against the outer surfaces of the lites 701, 702. In the case where the flange portions 721, 722 are folded such that they lie against the outer surfaces of the lites 701, 702, it is preferred that the flanges are also joined to the surfaces of the lites, e.g., by adhesive, solder or other adherent materials. Note, however, this joining of the flanges to the lites need not be hermetic.

As seen in FIGS. 7a, 7b and 7c, one method of assembling a VIGU/IGU 700 is to take the following numbered steps: 1)

Unload (e.g., unspool if stored on a spool) a length of first inner member 709; wrap the length of inner member 709 around first lite 701, cut and join member 709 to itself at the location where it would otherwise overlap itself; and join member 709 to the edge 713 of lite 701 where it is coincident after wrapping. 2) Unload (e.g., unspool if stored on a spool) a length of second inner member 710; wrap the length of inner member 710 around second lite 702, cut and join member 710 to itself at the location where it would otherwise overlap itself; and join member 710 to the edge 714 of lite 702 where it is coincident after wrapping. 3) Position first lite 701 and second lite 702 in a spaced-apart configuration forming the cavity 703 and including any other assembly parts such as spacers (not shown) between the lites 701, 702. 4) Unload (e.g., unspool if stored on a spool) a length of outer member 704 having a compliant region 720 with a three-dimensional surface pattern; wrap the outer member 704 around the assembly of lites 701, 702 and inner members 709, 710; cut and join outer member 704 to itself at the location where it would otherwise overlap itself and join outer member 704 to one of the inner members 709 and 710 where it is coincident after wrapping. 5) Place the assembly in a vacuum chamber to evacuate the vacuum cavity 703 and seal the vacuum cavity by joining outer member 704 to the remaining inner member 709 or 710 where it is coincident. In an alternative method, step 5) above may be replaced with step 5a) as follows: 5a) Seal the vacuum cavity by joining outer member 704 to the remaining inner member 709 or 710 where it is coincident; then evacuating the vacuum cavity 703 via an evacuation port; and then sealing the evacuation port.

Figure 8:
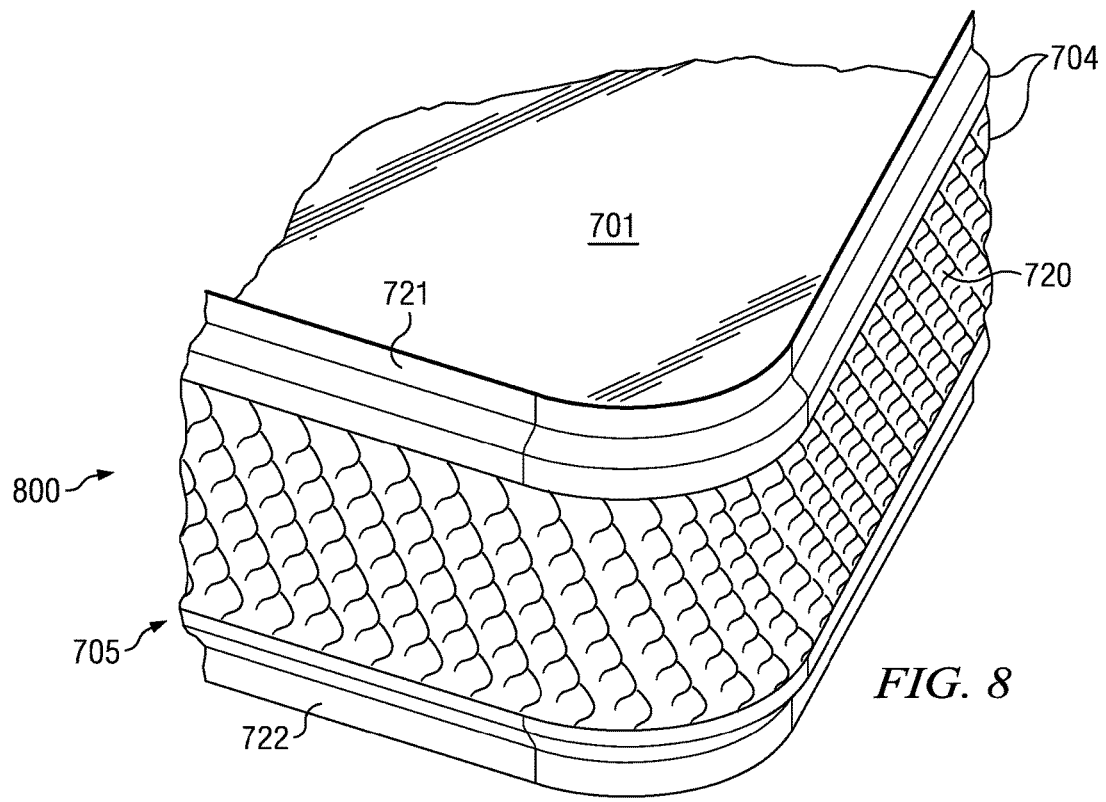
FIG. 8 is a perspective view of the corner of a VIGU/IGU similar to that shown in FIGS. 7a, 7b and 7c.

Referring now to FIG. 8, there is illustrated a VIGU/IGU assembly 800 similar to the VIGU/IGU 700 depicted in FIGS. 7a, 7b and 7c, but showing how the compliant edge-seal 705 with compliant, three-dimensional patterned region 720 could be wrapped around the corners of the VIGU/IGU. The first and second inner members 709, 710 are first joined, respectively, to the first and second lites 701, 702 (including the corners of the lites) as previously described. Next, the outer member 704 is joined to the inner members 709, 710 (including around the corners) as previously described. Finally, the edge seal flanges 721, 722 are folded down such that they lie against the outer surfaces of the lites 701, 702 and then joined to the surfaces of the lites as previously described. It will be appreciated that the portions of the flanges 721, 722 wrapped around the corners of the lites may incur creases as they are folded back against the surface of the lites 701, 702, however, these creases do not compromise the sealing function of the seal assembly 705 as the joint created between the respective sealing surfaces 711, 712 of inner members 709, 710 and the edges 713, 714 of the lites prior to folding remains a continuous joint free of creasing.

Figure 9A:
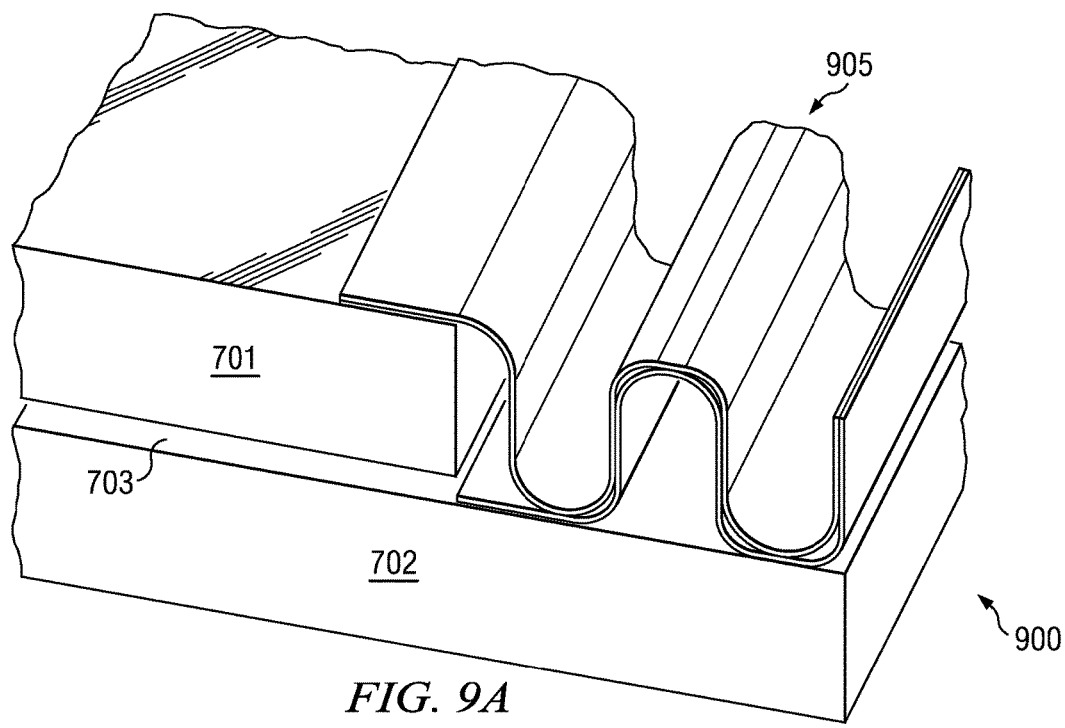
FIGS. 9a and 9b are cross-sectional perspective views of a VIGU/IGU in accordance with another embodiment, FIG. 9a showing the edge seal with the three-dimensional pattern omitted for purposes of illustration and FIG. 9b showing the edge seal with the location of the three-dimensional pattern indicated by checkerboard markings.
Figure 9B:
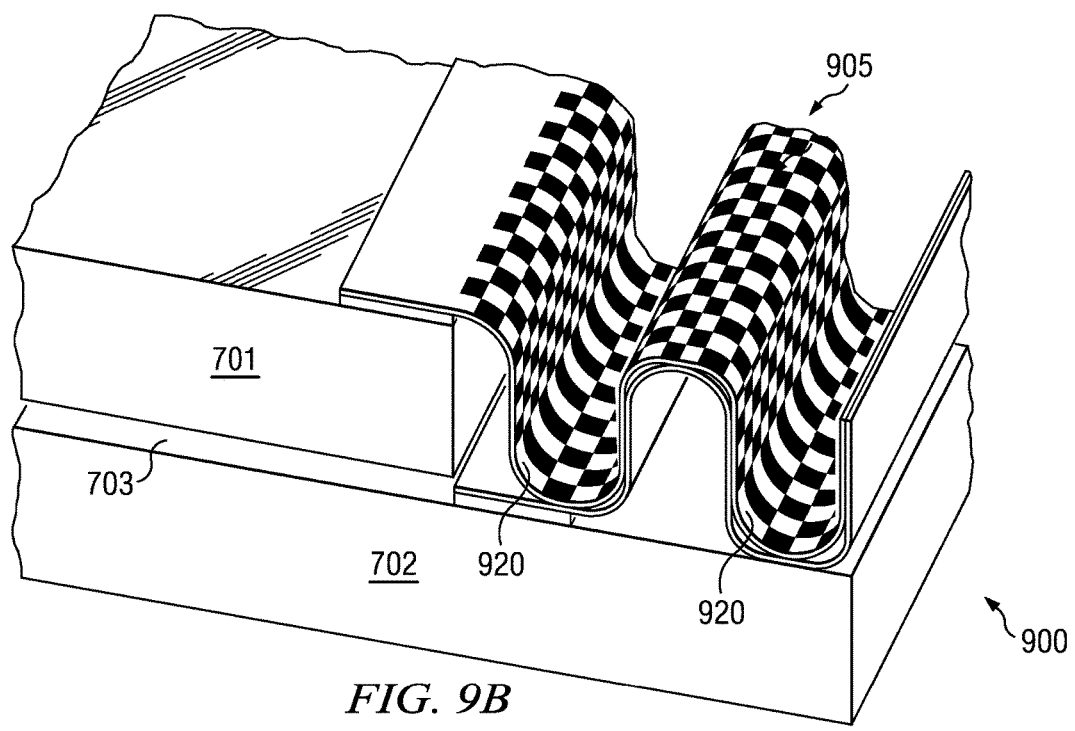

Referring now to FIGS. 9a and 9b, there is illustrated a VIGU/IGU 900 with an alternative edge seal configuration 905 that can accommodate the disclosed method of obtaining longitudinal compliance through the use of a three dimensional imprinted pattern. Specifically, FIG. 9a shows the edge seal 905 with the three dimensional pattern of the compliant region 920 not shown for purposes of clearly illustrating the seal configuration; whereas FIG. 9b shows the same VIGU/IGU 900 with the location of the compliant region 920 indicated by use of a checkerboard pattern. Seal 905 is a bellows type seal. The compliant region 920 may use any of the three-dimensional patterns previously described herein.

Figure 10A:
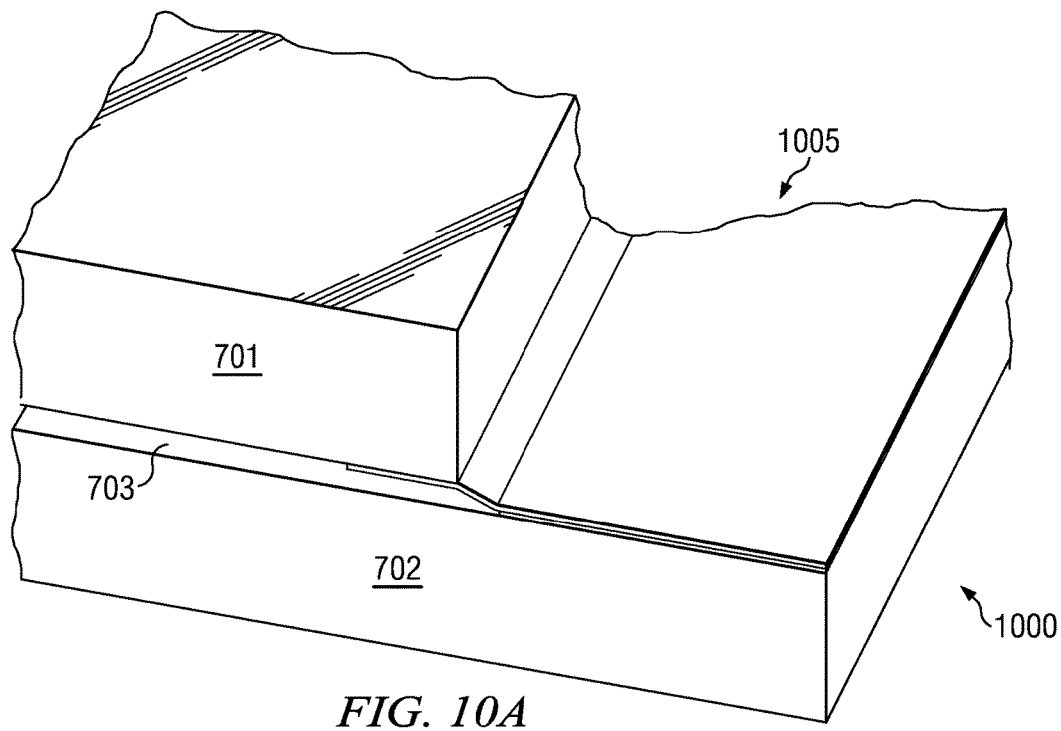
FIGS. 10a and 10b are cross-sectional perspective views of a VIGU/IGU in accordance with another embodiment, FIG. 10a showing the edge seal with the three-dimensional pattern omitted for purposes of illustration and FIG. 10b showing the edge seal with the location of the three-dimensional pattern indicated by checkerboard markings.
Figure 10B:
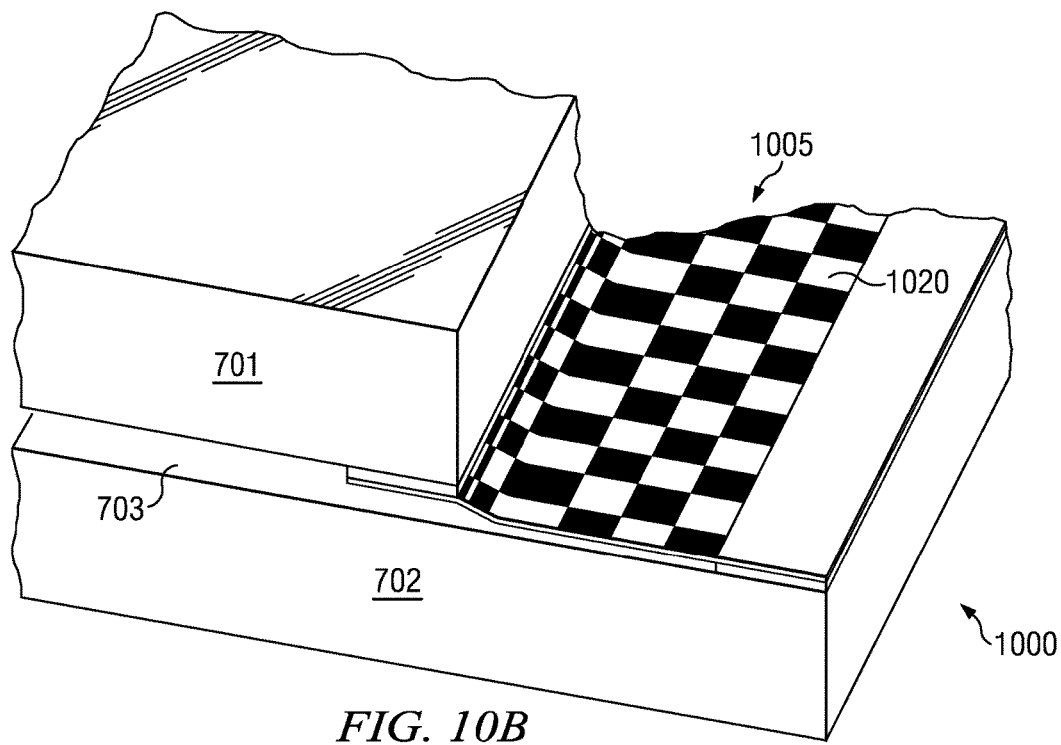

Referring now to FIGS. 10a and 10b, there is illustrated a VIGU/IGU 1000 with an alternative edge seal configuration 1005 that can accommodate the disclosed method of obtaining longitudinal compliance through the use of a three-dimensional imprinted pattern. Specifically, FIG. 10a shows the edge seal 1005 with the three-dimensional pattern of the compliant region 1020 not shown for purposes of clearly illustrating the seal configuration; whereas FIG. 10b shows the same VIGU/IGU 1000 with the location of the compliant region 1020 indicated by use of a checkerboard pattern. Seal 1005 is a flat seal. The compliant region 1020 may use any of the three-dimensional patterns previously described herein.

Figure 11A:
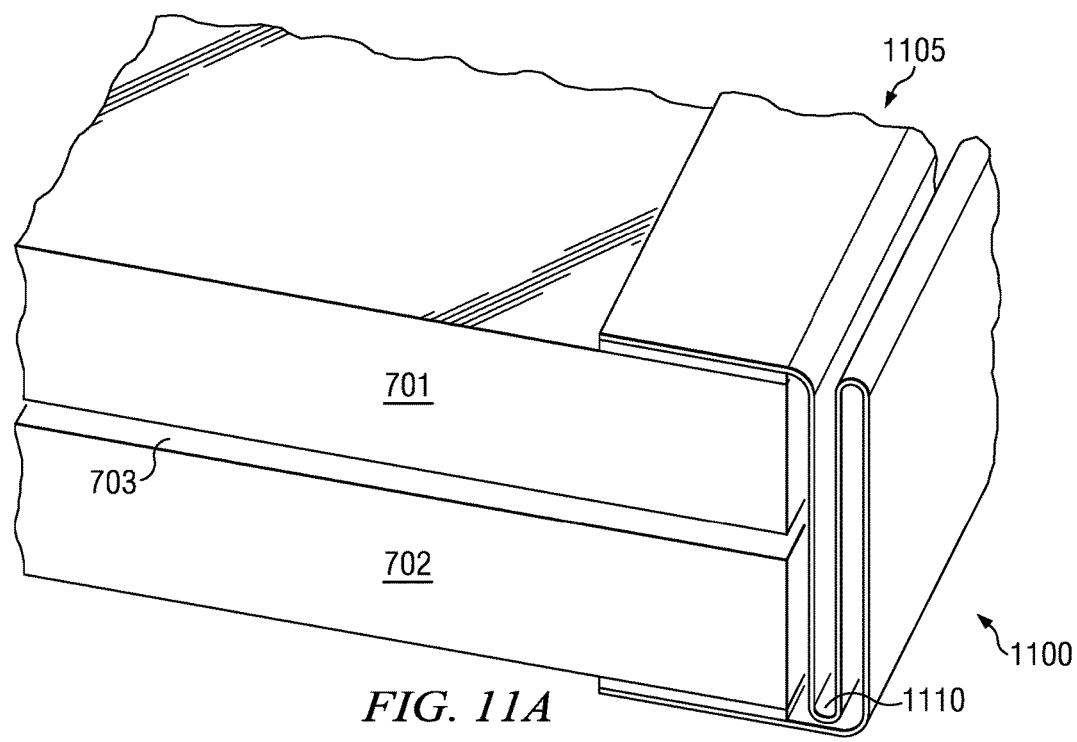
FIGS. 11a and 11b are cross-sectional perspective views of a VIGU/IGU in accordance with another embodiment, FIG. 11a showing the edge seal with the three-dimensional pattern omitted for purposes of illustration and FIG. 11b showing the edge seal with the location of the three-dimensional pattern indicated by checkerboard markings.
Figure 11B:
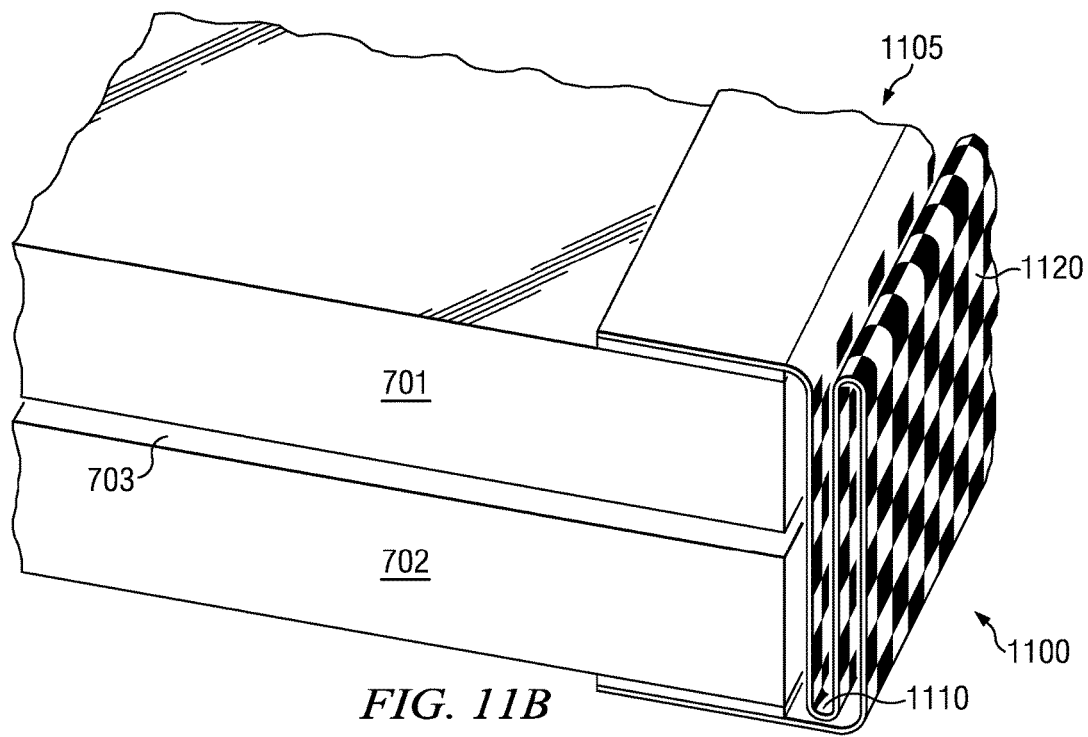

Referring now to FIGS. 11a and 11b, there is illustrated a VIGU/IGU 1100 with an alternative edge seal configuration 1105 that can accommodate the disclosed method of obtaining longitudinal compliance through the use of a three-dimensional imprinted pattern. Specifically, FIG. 11a shows the edge seal 1105 with the three-dimensional pattern of the compliant region 1120 not shown for purposes of clearly illustrating the seal configuration; whereas FIG. 11b shows the same VIGU/IGU 1100 with the location of the compliant region 1120 indicated by use of a checkerboard pattern. Seal 1105 is similar to the embodiment described in connection with FIGS. 7a, 7b and 7c, except there is an extra convolution 1110 in the geometry which may further increase longitudinal compliance and further increase the thermal resistance through the edge seal. The compliant region 1120 may use any of the three-dimensional patterns previously described herein.

Figure 12A:
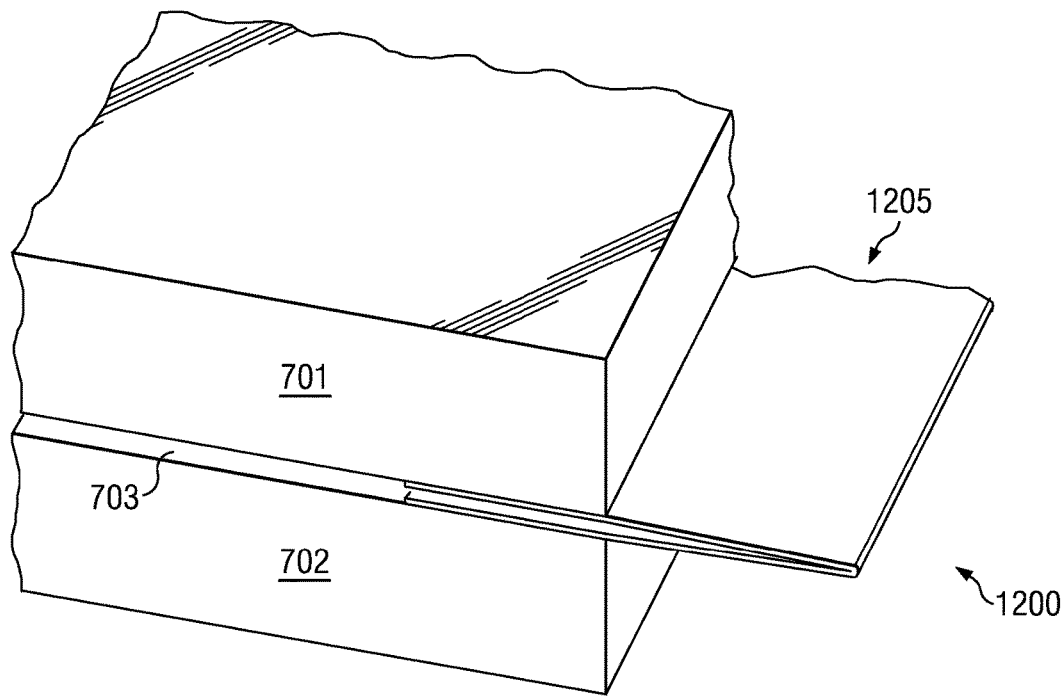
FIGS. 12a and 12b are cross-sectional perspective views of a VIGU/IGU in accordance with another embodiment, FIG. 12a showing the edge seal with the three-dimensional pattern omitted for purposes of illustration and FIG. 12b showing the edge seal with the location of the three-dimensional pattern indicated by checkerboard.
Figure 12B:
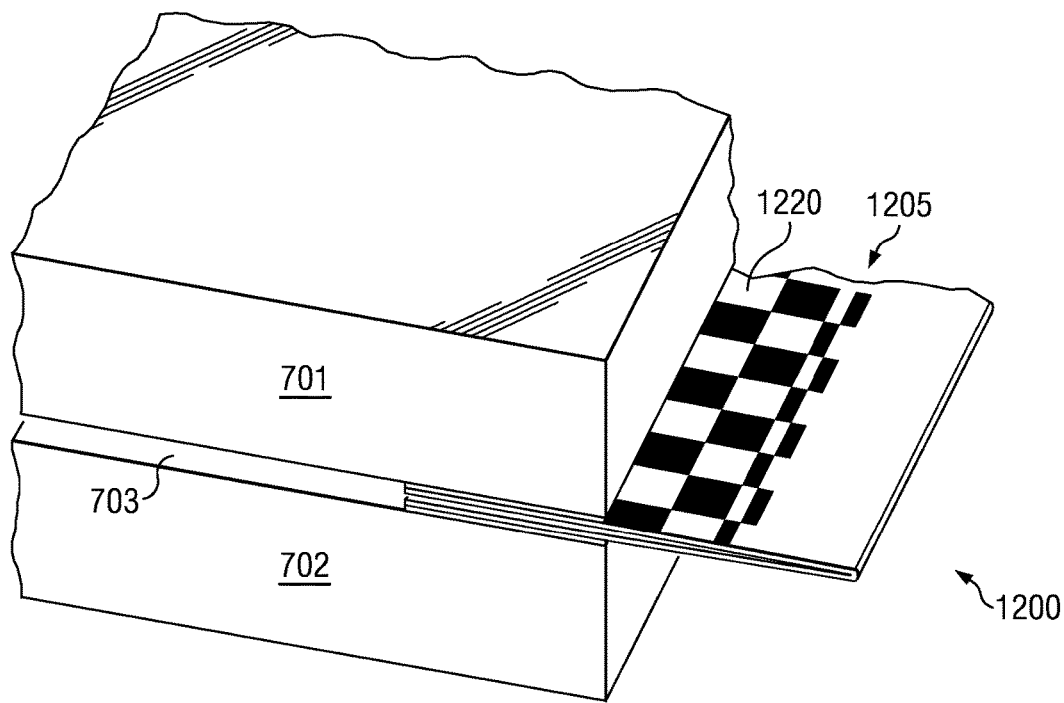

Referring now to FIGS. 12a and 12b, there is illustrated a VIGU/IGU 1200 with an alternative edge seal configuration 1205 that can accommodate the disclosed method of obtaining longitudinal compliance through the use of a three-dimensional imprinted pattern. Specifically, FIG. 12a shows the edge seal 1205 with the three-dimensional pattern of the compliant region 1220 not shown for purposes of clearly illustrating the seal configuration; whereas FIG. 12b shows the same VIGU/IGU 1200 with the location of the compliant region 1220 indicated by use of a checkerboard pattern. Seal 1205 is another type of flat seal. The compliant region 1220 may use any of the three-dimensional patterns previously described herein.

Figure 13D:
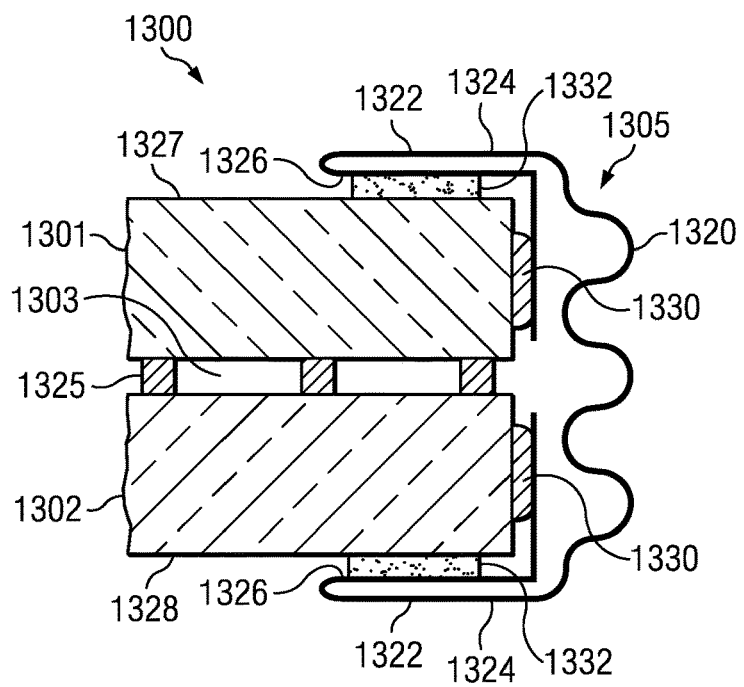

Referring now to FIGS. 13a, 13b, 13c and 13d, there is illustrated a VIGU/IGU 1300 having a one-piece edge seal in accordance with another embodiment, and a method of producing a VIGU/IGU having a one-piece edge seal in accordance with yet another embodiment. Specifically, FIG. 13a shows a cross-sectional view of a one-piece edge seal 1305 comprising a central compliant portion 1320 disposed between two lateral portions 1322. The edge seal 1305 may be formed from a hermetic material, preferably a foil or thin sheet of metal or metal alloy that can be soldered and/or welded. Preferably, the material of the edge seal 1305 is spoolable, i.e., it may be stored in a rolled-up state on a spool (or reel) until needed for assembly.

The compliant portion 1320 of the edge seal 1305 may have a surface formed in a three-dimensional pattern, e.g., the three-dimensional patterns previously described in connection with FIGS. 2, 3a, 3b, 4a, 4b, 5a, 5b, 6a and/or 6b. Each lateral portion 1322 includes a proximal section 1324 disposed adjacent to the central compliant portion 1320 and a distal section 1326 disposed on the opposite side of the proximal section from the compliant portion.

Referring now to FIG. 13b, the one-piece edge seal 1305 is positioned so that the compliant portion 1320 lies adjacent a first lite 1301 and second lite 1302, which are spaced apart to define an insulating cavity 1303 disposed therebetween (which will later be evacuated). In particular, the compliant portion 1320 is aligned with edges 1313 and 1314, respectively, of the lites 1301 and 1302. The lites 1301 and 1302 are formed from a hermetic transparent material, preferably glass. A plurality of stand-off members 1325 (FIG. 13*d*) may be positioned in the cavity 1303 between the lites 1301 and 1302 to maintain separation of the lites. For purposes of illustration, the stand-off members 1325 are not shown in FIGS. 13*b* and 13*c*. The stand-off members may be affixed to one or both of the lites 1301, 1302 or held in place by other means, e.g., suspended on fibers or held in position by friction between the lites. The stand-off members 1325 may be formed of glass, ceramic, metal or other materials having high compression strength and little or no out-gassing.

Referring still to FIG. 13*b*, each lateral portion 1322 of the edge seal 1305 is first folded between the proximal section 1324 and the distal section 1326 to bring at least a first part of the distal section directly adjacent to the edges 1313 and 1314 of the lites 1301 and 1302, i.e., interposed between the edges 1313, 1314 and the compliant portion 1320. As further described herein, each first part of the distal section 1326 of the edge seal 1305 is then bonded to the respective adjacent edge 1313, 1314 of the lites 1301, 1302 to form a hermetic bond 1330 (FIG. 13*d*). The hermetic bond 1330 must be capable of blocking the passage of gasses into the cavity 1303 to maintain the required hermeticity, but it is not required to withstand any significant structural loads arising from the compliant portion 1320 of the edge seal 1305. In some embodiments, the hermetic bond 1330 comprises a solder. In preferred embodiments, the solder is a metallic solder, however, in other embodiments the solder may be a solder glass.

Referring now to FIG. 13*c*, after hermetically bonding the first part of each distal section 1326 to the edges 1313, 1314, the lateral portion 1322 is folded a second time such that the remaining parts of the distal section lie against the respective faces 1327, 1328 of lites 1301, 1302 and the proximal portions 1324 lie substantially parallel to the faces. As further described herein, each remaining part of the distal section 1326 of the edge seal 1305 is then bonded to the respective adjacent face 1327, 1328 to form a structural bond 1332 (FIG. 13*d*). The structural bond 1332, unlike the hermetic bond 1330, need not be capable of blocking the passage of gasses into the cavity 1303. Instead, the structural bond 1332 must withstand the structural loads arising from the compliant portion 1320 and prevent the transmission of any significant structural loads to the hermetic bond 1330. Accordingly, the structural bond 1332 is always interposed along the edge seal 1305 between the compliant portion 1320 and the hermetic bond 1330 (i.e., when considering the edge seal 1305 as extending continuously from one distal end to the opposite distal end). In some embodiments, the structural bond 1332 may comprise one of a thermoset or a thermoplastic. In preferred embodiments, the structural bond 1332 may comprise one or more of acrylic, epoxy, urethane, polyester, polyimide, phenolic, polyamide, cyanoacrylate, polyacrylate, and polyvinyl acetate.

Referring now to FIG. 13*d*, the VIGU 1300 is shown, including the lites 1301, 1302, edge seal 1305 and stand-off members 1325 (for purposes of illustration, only an end portion of the complete VIGU is shown). The insulating cavity 1303 is evacuated to a vacuum, typically through an evacuation port (not shown) following forming the hermetic bonds 1330 and the structural bonds 1332. In one embodiment of the VIGU 1300, the hermetic materials, including the hermetic bond 1330, are hermetic for at least ten years. In another embodiment, the hermetic materials, including the hermetic bond 1330, are hermetic for at least thirty years. In yet another embodiment, the hermetic materials, including the hermetic bond 1330, are hermetic for at least forty years. In a preferred embodiment, the insulating cavity 1303 is evacuated to a vacuum within the range of $1 \times 10^{-6}$ torr to $1 \times 10^{-3}$ torr. Alternatively, an insulating glazing unit (IGU) (not shown) may be constructed in a substantially identical fashion, except the materials and seals need not be hermetic and the atmosphere within the insulating cavity is a partial vacuum and/or filed with an insulating gas or gas mixture. As describe above, the evacuation, partial evacuation or (in the case of IGUs) filling with insulating gasses of the insulating cavity 1303 may be achieved at the time of sealing the insulating cavity by sealing it while the VIGU/IGU 1300 is in, respectively, a vacuum chamber, a partial vacuum chamber or a gas-filled chamber. Alternatively, the evacuation and/or filling of the insulating cavity 1303 may be achieved after the insulating cavity has been sealed via an evacuation tube.

Figure 14D:
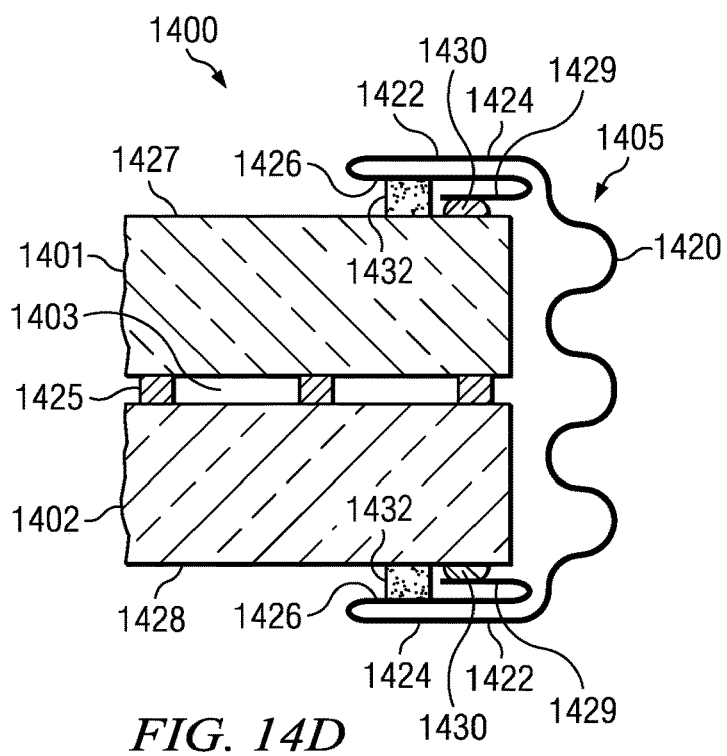
FIGS. 14a, 14b, 14c and 14d are cross-sectional side views of a VIGU/IGU in accordance with an alternative embodiment having a single piece edge seal.
Figures 14A, 14B, 14C:
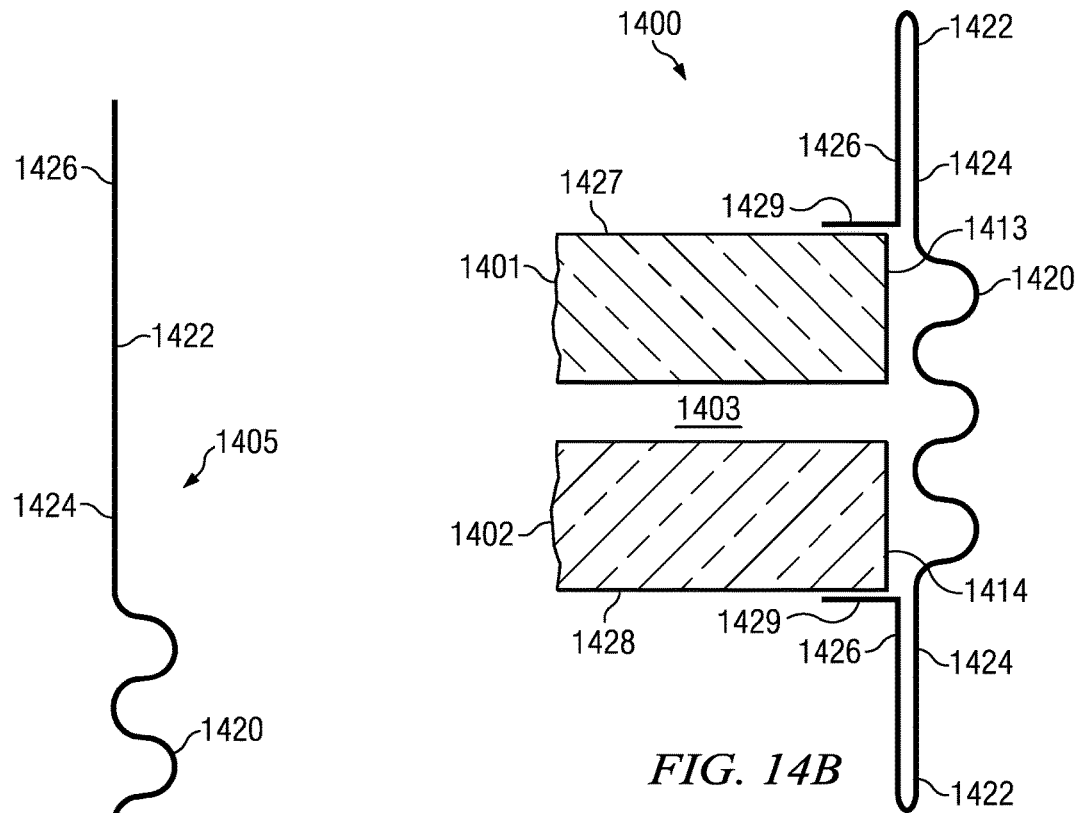
Figure 15:
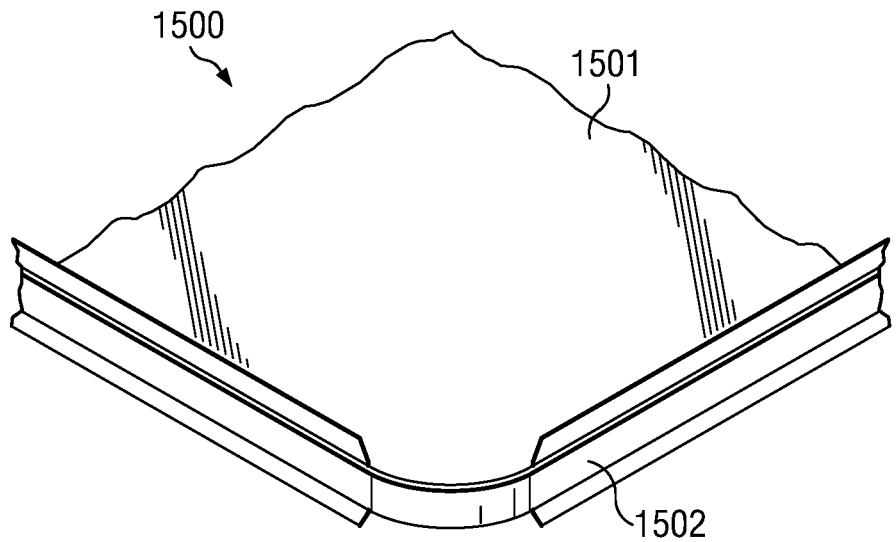
FIG. 15 is a perspective view of a corner portion of a VIGU/IGU having large-radius corners showing one configuration of an edge seal in the corner region.
Figure 16:
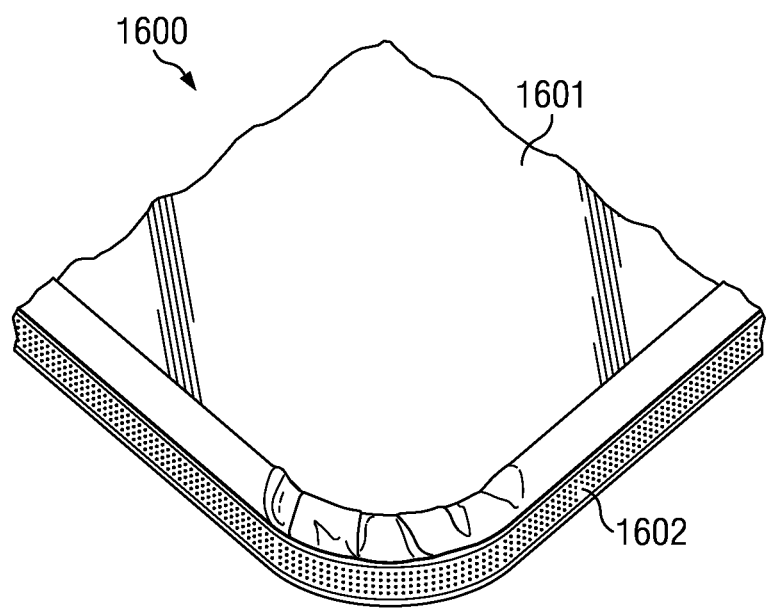
FIG. 16 is a perspective view of a corner portion of another VIGU/IGU having large-radius corners showing an alternative configuration of an edge seal in the corner region.
Figure 17:
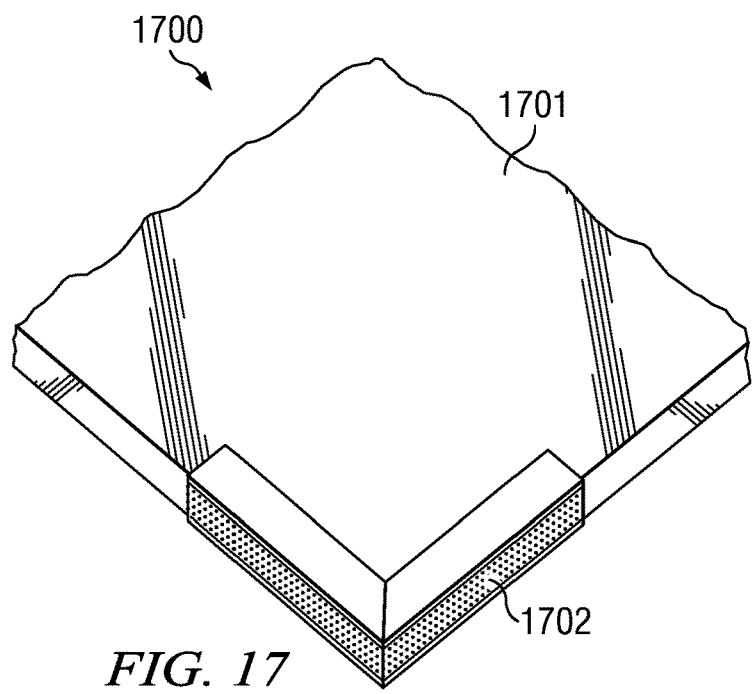
FIG. 17 is a perspective view of a corner portion of a VIGU/IGU having sharp-radius corners showing one configuration of an edge seal in the corner region.
Figure 18:
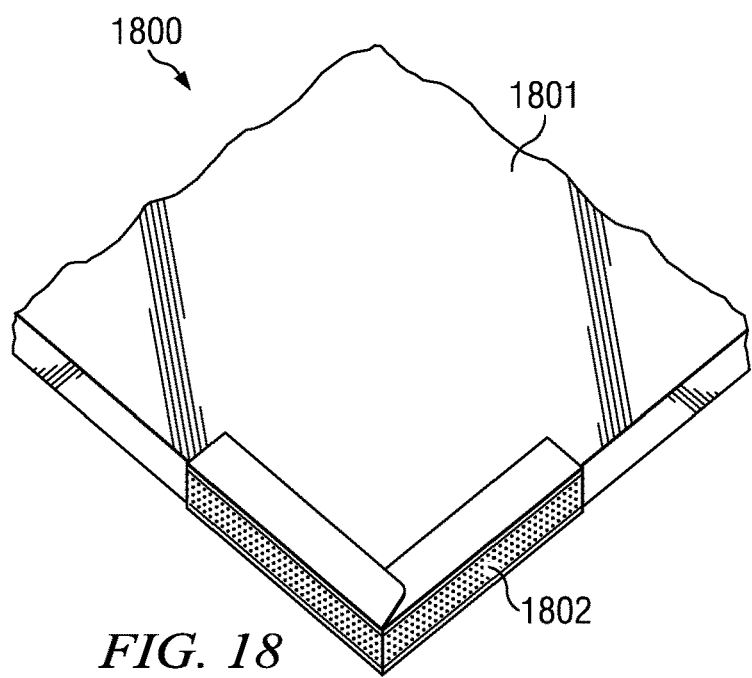
FIG. 18 is a perspective view of a corner portion of another VIGU/IGU having sharp-radius corners showing an alternative configuration of an edge seal in the corner region.

Referring now to FIGS. 14*a*, 14*b*, 14*c* and 14*d*, there is illustrated a VIGU/IGU 1400 having an alternative one-piece edge seal in accordance with another embodiment, and a method of producing a VIGU/IGU having an alternative one-piece edge seal in accordance with yet another embodiment. Specifically, FIG. 14*a* shows a cross-sectional view of a one-piece edge seal 1405 comprising a central compliant portion 1420 disposed between two lateral portions 1422. The edge seal 1405 may be formed from a hermetic material, preferably a foil or thin sheet of metal or metal alloy that can be soldered and/or welded. Preferably, the material of the edge seal 1405 is spoolable, i.e., it may be stored in a rolled-up state on a spool (or reel) until needed for assembly.

The compliant portion 1420 of the edge seal 1405 may have a surface formed in a three-dimensional pattern, e.g., the three-dimensional patterns previously described in connection with FIGS. 2, 3*a*, 3*b*, 4*a*, 4*b*, 5*a*, 5*b*, 6*a* and/or 6*b*. Each lateral portion 1422 includes a proximal section 1424 disposed adjacent to the central compliant portion 1420 and a distal section 1426 disposed on the opposite side of the proximal section from the compliant portion.

Referring now to FIG. 14*b*, the one-piece edge seal 1405 is positioned so that the compliant portion 1420 lies adjacent a first lite 1401 and second lite 1402, which are spaced apart to define an insulating cavity 1403 disposed therebetween. In particular, the compliant portion 1420 is aligned with edges 1413 and 1414, respectively, of the lites 1401 and 1402. The lites 1401 and 1402 are formed from a hermetic transparent material, preferably glass. A plurality of stand-off members 1425 (FIG. 14*d*) may be positioned in the cavity 1403 between the lites 1401 and 1402 to maintain separation of the lites. The stand-off members may be affixed to one or both of the lites 1401, 1402 or held in place by other means, e.g., suspended on fibers or held in position by friction between the lites. The stand-off members 1425 may be formed of glass, ceramic, metal or other materials having high compression strength and little or no out-gassing.

Referring still to FIG. 14*b*, each lateral portion 1422 of the edge seal 1405 is first folded between the proximal section 1424 and the distal section 1426 to bring the ends of the distal section near the respective faces 1427, 1428 of the lites 1401, 1402. The distal sections 1426 are further folded to bring at least a first part 1429 of each distal section parallel to the faces 1427, 1428 of the lites. As further described herein, each first part 1429 of the distal section 1426 is then bonded to the respective adjacent face 1427, 1428 of the lites 1401, 1402 to form a hermetic bond 1430

(FIG. 14d). The hermetic bond 1430 must be capable of blocking the passage of gasses into the cavity 1403 to maintain the required hermeticity, but it is not required to withstand any significant structural loads arising from the compliant portion 1420 of the edge seal 1405. In some embodiments, the hermetic bond 1430 comprises a solder. In preferred embodiments, the solder is a metallic solder, however, in other embodiments the solder may be a solder glass.

Referring now to FIG. 14c, after hermetically bonding the first part 1429 of each distal section 1426 to the faces 1427, 1428 of the lites 1401, 1402, the lateral portion 1422 is folded again such that the remaining parts of the distal section lie substantially parallel to the faces. As further described herein, a portion of each remaining part of the distal section 1426, but not including any portion directly overlying the hermetic bond 1430, is then bonded to the respective adjacent face 1427, 1428 to form a structural bond 1432 (FIG. 14d). The structural bond 1432, unlike the hermetic bond 1430, need not be capable of blocking the passage of gasses into the cavity 1403. Instead, the structural bond 1432 must withstand the structural loads arising from the compliant portion 1420 and prevent the transmission of any significant structural loads to the hermetic bond 1430. Accordingly, the structural bond 1432 is always interposed along the edge seal 1405 between the compliant portion 1420 and the hermetic bond 1430 (i.e., when considering the edge seal 1405 as extending continuously from one distal end to the opposite distal end). The structural bond 1432 may be formed of the same materials previously described in connection with structural bond 1332 of the previous embodiment.

Referring now to FIG. 14d, the VIGU 1400 is shown, including the lites 1401, 1402, edge seal 1405 and stand-off members 1425 (again, for purposes of illustration, only an end portion of the complete VIGU is shown). In one embodiment of the VIGU 1400, the hermetic materials, including the hermetic bond 1430, are hermetic for at least ten years. In another embodiment, the hermetic materials, including the hermetic bond 1430, are hermetic for at least thirty years. In yet another embodiment, the hermetic materials, including the hermetic bond 1430, are hermetic for at least forty years. In a preferred embodiment, the insulating cavity 1403 is evacuated to a vacuum within the range of $1 \times 10^{-6}$ torr to $1 \times 10^{-3}$ torr. Alternatively, an insulating glazing unit (IGU) (not shown) may be constructed in a substantially identical fashion, except the materials and seals need not be hermetic and the atmosphere within the insulating cavity is a partial vacuum and/or filed with an insulating gas or gas mixture. As describe above, the evacuation, partial evacuation or (in the case of IGUs) filling with insulating gasses of the insulating cavity 1403 may be achieved at the time of sealing the insulating cavity by sealing it while the VIGU/IGU 1400 is in, respectively, a vacuum chamber, a partial vacuum chamber or a gas-filled chamber. Alternatively, the evacuation and/or filling of the insulating cavity 1403 may be achieved after the insulating cavity has been sealed via an evacuation tube.

Referring now to FIGS. 15, 16, 17 and 18 there are illustrated perspective views of various VIGU/IGUs 1500, 1600, 1700 and 1800 showing the seal configuration of the respective edge seals 1502, 1602, 1702 and 1802 as they are attached to the corners of the respective glass lites 1501, 1601, 1701 and 1801.

A preferred method for forming the hermetic bonds, e.g., the hermetic bonds 1330 or 1430 previously described, is by ultrasonic soldering using a flux-free solder. Suitable flux-free solder and ultrasonic soldering equipment are produced by Cerasolzer, for example Cerasolzer GS 217 solder or GS 220 solder. In a preferred embodiment, the surfaces of the edge seal and the lites that are to be bonded in the hermetic bond have solder pre-applied (i.e., known as "pre-tinning"). Further, at least the surfaces to be hermetically bonded, and preferably the entire lites, are preheated to a pre-heat temperature above the solder's liquidus temperature prior to forming the hermetic bonds.

Figure 19A:
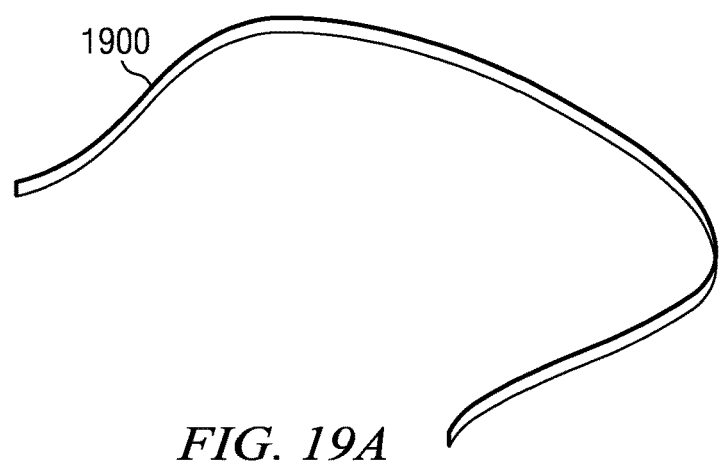
FIGS. 19a, 19b, 19c, 19d and 19e are perspective views illustrating the fabrication of a metal edge band and its attachment to a glass pane in accordance with another embodiment.
Figure 19B:
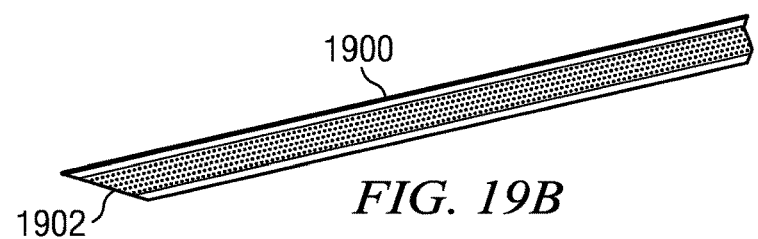
Figure 19C:
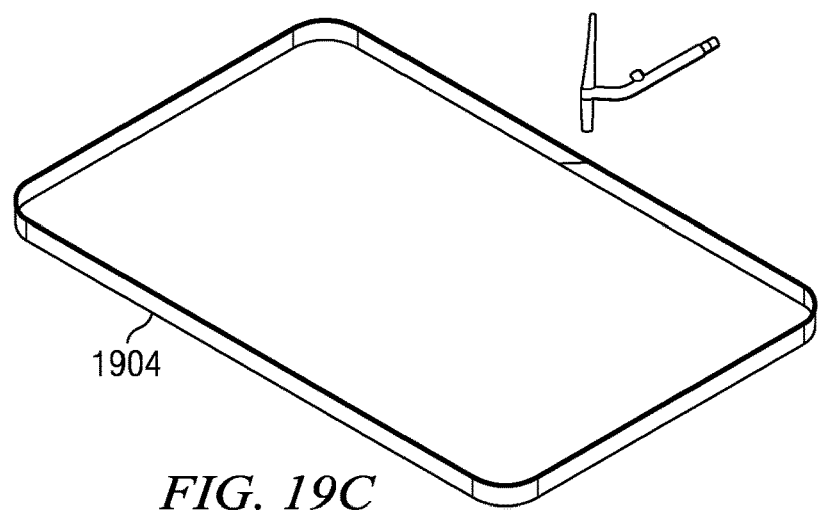
Figure 19D:
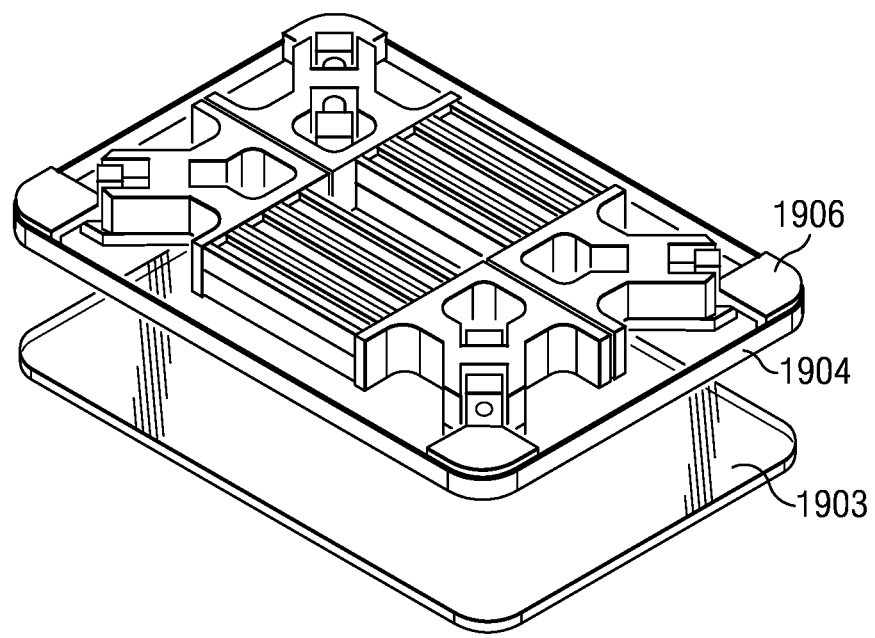

In one embodiment, the following steps are used: (1) Pre-heat the glass lite and pre-tin the perimeter of the glass lite using ultrasonic soldering; (2) Pre-tin the inside of the metal edge band that will later be wrapped around and soldered to the glass lite; (3) The metal edge band does not have to be pre-heated but it is preferable to do so before ultrasonically solder pre-tinning its surface; (4) Use tooling (FIG. 19d) to stretch the pre-tinned metal band so it is large enough to slide onto the perimeter of the now pre-tinned glass; (5) Pre-heat the assembly past the liquid temperature of the solder; and (6) Apply heat and ultrasonic excitation to the metal band to again break any oxides in the molten solder, moving the hot soldering iron tip all the way around the metal band. If the metal band is elastic enough after stretching, apply the ultrasonic energy to the band where it overlaps the perimeter edge of the glass. Preferably, a compressive fixture is used to hold the edge seal band tight against the perimeter of the pre-tinned glass lite.

Ultrasonic excitation is applied to the part of the metal band that extends past the edge of the glass and have the band-tensioning fixture apply the pressure to keep the metal band in very close contact with the glass edge. The band and glass cannot be in intimate contact as we have solder between the two and want to achieve a hermetic soldered bond or connection.

Figure 19E:
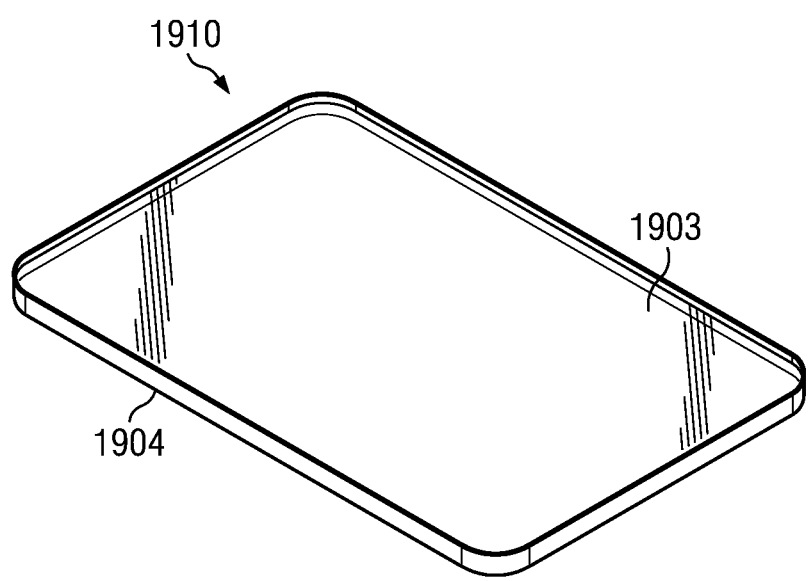

Referring now to FIGS. 19a, 19b, 19c, 19d and 19e, an automated process for applying metal bands around the lite or lites is described that may comprise the following steps. The glass is cut and the edge is prepared for solder pre-tinning, if necessary by one of several means. Cleaning may be required prior to soldering. Smoothing the edge may be required to result in less porosity and a more hermetic solder-to-glass interface. This is an especially important consideration if the glass is cut using a water jet cutter, as the abrasive cutting fluid leaves grooves horizontal to the two large surfaces of the glass, 90 degrees or perpendicular from the direction one would want if one had to work with soldering to a grooved perimeter surface. Glass fabricators call the process of smoothing the edge of cut glass, "seaming." Smoothing processes are done prior to tempering the glass. These include grinding, sanding, heating such as with a torch to locally melt the glass to form a smooth surface, polishing, and other processes. After any smoothing and cleaning operations, preheat the glass and pre-tin the glass lite' s perimeter. Cut the metal strip 1900 for the edge seal (or edge seal bands) to the correct length (FIG. 19a), dress the ends 1902 (FIG. 19b) and butt-weld the band together (FIG. 19c) by TIG, laser or other means and then pre-tin the inside of the band where it will come into contact with the edge of the glass lite 1903. Stretch the completed band 1904 (FIG. 19d) using a stretching fixture 1906 enough to enable the edge seal/band system 1904 to then slide the stretched band over or around the perimeter of the glass lite 1903 (FIG. 19e). Next, the banded assembly 1910 is heated until the flux-free solder is in a liquid state. Ultrasonic excitation may be applied. Compressive force may be applied to increase the molten solder's contact area between the metal band and the glass lite. After the metal band 1904 is completely soldered to the glass lite 1903, the assembly is cooled to room temperature, probably with blowing air to decrease the cool-down time. Another way to apply pressure while soldering would be to have one or more heated rollers apply simultaneous pressure and ultrasonic energy to the outside of the pre-tinned metal band of the heated assembly and have the rollers travel around the heated assembly until all the molten solder has been agitated with appropriate ultrasonic energy.

It will be appreciated by those skilled in the art having the benefit of this disclosure that this method and apparatus for an insulating glazing unit and compliant seal for an insulating glazing unit provides an insulating glazing unit having greatly improved performance and lifespan. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method of manufacturing an insulating glazing unit, the method comprising the following steps:
   a) wrapping a first inner member around a first lite, joining ends of the first inner member together where the ends of the first inner member meet around the first lite to form a continuous band of first inner member abutting the first lite, and joining the first inner member to the first lite along an edge of the first lite abutting the first inner member after wrapping;
   b) wrapping a second inner member around a second lite, joining ends of the second inner member together where the ends of the second inner member wrapped around the second lite meet to form a continuous band of second inner member abutting the second lite, and joining the second inner member to the second lite along an edge of the second lite abutting the second inner member after wrapping;
   c) positioning the first lite and the second lite in a spaced-apart configuration forming an insulating cavity therebetween;
   d) providing an outer member comprising a region with a three-dimensional surface pattern of protrusions repeating and extending in a plurality of directions along a surface of the region, wrapping the outer member around the assembly of first and second lites and first and second inner members, joining ends of the outer member together where the ends of the outer member wrapped around the assembly of first and second lites and first and second inner members meet to form a continuous band of outer member abutting the assembly of first and second lites and first and second inner members, and joining the outer member to each one of the first and second inner members to form a pair of continuous seals; and
   e) evacuating the insulating cavity and sealing the insulating cavity.

2. The method of claim 1, wherein during the step of evacuating, the insulating cavity is evacuated to a vacuum within the range from $1 \times 10^{-6}$ torr to $1 \times 10^{-3}$ torr.

3. The method of claim 1, further comprising:
   in step a), after the first inner member is wrapped around the first lite, cutting a length of the first inner member to define the ends of the first inner member which are then joined to form the continuous band of first inner member abutting the first lite;
   in step b), after the second inner member is wrapped around the second lite, cutting a length of the second inner member to define the ends of the second inner member which are then joined to form the continuous band of second inner member abutting the second lite; and
   in step d), after the outer member is wrapped around the assembly of first and second lites and first and second inner members, cutting a length of the outer member to define the ends of the outer member which are then joined to form the continuous band of outer member abutting the assembly of first and second lites and first and second inner members.

4. The method of claim 1, wherein steps a)-e) are performed in the order indicated.

5. The method of claim 1, wherein steps a)-e) are performed in an order rearranged from the order indicated and/or with repeated steps.

6. The method of claim 1, wherein at least one of steps a) and b) further comprises joining the inner member to the lite using a solder excited by ultrasonic soldering.

7. The method of claim 6, further comprising the steps of pre-heating the lite above the liquidus temperature of the solder and pre-tinning the lite with the solder prior to joining the inner member to the lite.

8. A method of manufacturing a vacuum insulating glazing unit, the method comprising the following steps:
   a) providing a first lite formed from a hermetic transparent material and having an outer surface, an inner surface and a peripheral edge;
   b) providing a second lite formed from a hermetic transparent material and having an outer surface, an inner surface and a peripheral edge;
   c) positioning the first and second lites in a spaced-apart configuration to define an insulating cavity therebetween bounded by the respective inner surfaces of the first and second lites;
   d) providing an edge seal extending between the first lite and the second lite, the edge seal being formed from a hermetic material and including a first lite bonding region, a second lite bonding region and a three-dimensional surface region disposed between the first and second lite bonding regions, the three-dimensional surface region comprising a three-dimensional pattern of protrusions repeating along a surface of the three-dimensional surface region, the three-dimensional pattern extending in a plurality of directions over the surface of the three-dimensional surface region;
   e) forming a first hermetic bond between a first portion of the first lite bonding region of the edge seal and the first lite;
   f) forming a first structural bond between a second portion of the first lite bonding region of the edge seal and the first lite, the first structural bond being disposed along the edge seal in an interposed configuration between the first hermetic bond and the three-dimensional surface region of the edge seal;
   g) forming a second hermetic bond between a first portion of the second lite bonding region of the edge seal and the second lite; and h) forming a second structural bond between a second portion of the second lite bonding region of the edge seal and the second lite, the second structural bond being disposed along the edge seal in an interposed configuration between the second hermetic bond and the three-dimensional surface region of the edge seal.

9. The method of claim 8, wherein the steps a)-h) are performed in the order indicated.

10. The method of claim 8, wherein the steps a)-h) are performed in an order rearranged from the order indicated and/or with repeated steps.

11. The method of claim 8, wherein at least one of steps e) and g) further comprises forming a hermetic bond between the lite and the edge seal using a solder excited by ultrasonic soldering.

12. The method of claim 11, wherein at least one of steps e) and g) further comprises pre-heating the lite above the liquidus temperature of the solder prior to exciting the solder by ultrasonic soldering.

13. The method of claim 11, further comprising the step of pre-tinning the peripheral edge of the lite with the solder prior to performing step d).

14. The method of claim 13, further comprising the step of pre-tinning at least one of the first and second lite bonding regions of the edge seal with the solder prior to performing step d).

15. The method of claim 8, wherein step d) further comprises:
cutting a strip of an edge seal material to a length that is less than the length of the peripheral edge of a respective one of the first and second lites;
joining the ends of the strip of the edge seal material to form a continuous band having an inner length smaller than the length of the peripheral edge of the respective first or second lite;
placing the continuous band on a stretching fixture;
stretching the continuous band until the inner length is equal to the length of the peripheral edge of the respective first or second lite;
transferring the stretched continuous band from around the stretching fixture to around the peripheral edge of the respective first or second lite.

16. The method of claim 8, wherein step d) further comprises:
providing a first inner edge seal portion around the first lite;
providing a second inner edge seal portion around the second lite; and
providing an outer edge seal portion joined to the first and second inner edge seal portions.

17. The method of claim 8, further comprising evacuating the insulating cavity.

18. The method of claim 17, wherein the insulating cavity is evacuated to a vacuum within the range from $1\times10^{-6}$ torr to $1\times10^{-3}$ torr.

19. The method of claim 8, further comprising providing a plurality of stand-off members in the insulating cavity between the first lite and the second lite.

20. The method of claim 8, wherein the first hermetic bond is formed on the first lite between the insulating cavity and the first structural bond, and the second hermetic bond is formed on the second lite between the insulating cavity and the second structural bond.

* * * * *